(12) United States Patent
Wu et al.

(10) Patent No.: US 9,980,289 B2
(45) Date of Patent: May 22, 2018

(54) METHOD AND APPARATUS FOR ESTABLISHING TRANSMISSION MODE

(71) Applicant: Huawei Technologies Co., Ltd., Shenzhen (CN)

(72) Inventors: Tianyu Wu, Shenzhen (CN); Yunbo Li, Shenzhen (CN); Bo Li, Xi'an (CN); Bo Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 353 days.

(21) Appl. No.: 14/958,874

(22) Filed: Dec. 3, 2015

(65) Prior Publication Data
US 2016/0088659 A1 Mar. 24, 2016

Related U.S. Application Data

(63) Continuation of application No. PCT/CN2014/072413, filed on Feb. 22, 2014.

(30) Foreign Application Priority Data

Jun. 3, 2013 (CN) .......................... 2013 1 0216455

(51) Int. Cl.
*H04W 74/08* (2009.01)
*H04W 74/00* (2009.01)
*H04W 84/12* (2009.01)

(52) U.S. Cl.
CPC ..... *H04W 74/0816* (2013.01); *H04W 74/006* (2013.01); *H04W 84/12* (2013.01)

(58) Field of Classification Search
CPC .................................................. H04W 74/00
See application file for complete search history.

(56) References Cited

U.S. PATENT DOCUMENTS

2005/0047384 A1* 3/2005 Wax .................... H04W 72/046
370/338
2011/0090855 A1 4/2011 Kim
(Continued)

FOREIGN PATENT DOCUMENTS

CN 101938792 A 1/2011
CN 102056325 A 5/2011
(Continued)

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications," IEEE Std 802.11, pp. i-2695, Institute of Electrical and Electronics Engineers, New York, New York (Mar. 29, 2012).
(Continued)

*Primary Examiner* — Zhiren Qin
(74) *Attorney, Agent, or Firm* — Leydig, Voit & Mayer, Ltd.

(57) ABSTRACT

Embodiments of the present invention provide a method and an apparatus for establishing a transmission mode, which relates to the field of network technologies, ensure backward compatibilities of an existing WLAN system and a next generation WLAN system, realize introduction of a new technology in the next generation WLAN protocol during data transmission, and improve network performance. The method includes: transmitting, by an access point AP, a first Clear To Send frame to a first station STA, to enable the first STA to set duration of a network allocation vector NAV of the first STA and remain in a silent state when the AP communicates with a second STA; transmitting the first Clear To Send frame to the second STA, to enable the second STA to process a Green Phase operation; and communicat-
(Continued)

ing with the second STA in a Green Phase period. The present invention is applied in data transmission.

17 Claims, 13 Drawing Sheets

(56) References Cited

U.S. PATENT DOCUMENTS

| | | | | |
|---|---|---|---|---|
| 2012/0129456 | A1* | 5/2012 | Xhafa | H04W 16/14 |
| | | | | 455/63.1 |
| 2013/0201857 | A1* | 8/2013 | Bhargava | H04K 3/222 |
| | | | | 370/252 |
| 2014/0204872 | A1 | 7/2014 | Yang et al. | |
| 2015/0065155 | A1* | 3/2015 | Abraham | H04W 74/0816 |
| | | | | 455/450 |

FOREIGN PATENT DOCUMENTS

| | | |
|---|---|---|
| CN | 102386954 A | 3/2012 |
| CN | 103002514 A | 3/2013 |
| CN | 103002544 A | 3/2013 |

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical layer (PHY) specifications; Amendment 4: Enhancements for Very High Throughput for Operation in Bands below 6 GHz," IEEE P802.11ac/D5.0, pp. i-413, Institute of Electrical and Electronics Engineers, New York, New York (Jan. 2013).

* cited by examiner his application is a continuation of International Patent
METHOD AND APPARATUS FOR ESTABLISHING TRANSMISSION MODE

CROSS-REFERENCE TO RELATED APPLICATIONS

This application is a continuation of International Patent Application No. PCT/CN2014/072413, filed on Feb. 22, 2014, which claims priority to Chinese Patent Application No. 201310216455.2, filed on Jun. 3, 2013, both of which are hereby incorporated by reference in their entireties.

TECHNICAL FIELD

The present invention relates to the field of network technologies and, in particular, to a method and an apparatus for establishing a transmission mode.

BACKGROUND

In development history of a wireless local area network (WLAN) protocol, there is no perfect formal specification for application of an orthogonal frequency division multiple access (OFDMA) technology and an uplink multiple user multiple-input multiple-output (MU-MIMO) technology in an existing WLAN protocol. Thus, some new technologies may be introduced in a next generation WLAN protocol, such as the OFDMA technology and the MU-MIMO technology, thereby exploiting performance advantages brought by these new technologies in the next generation WLAN system. The next generation WLAN system and the existing WLAN system have a shared spectrum. Thus, how to ensure compatibility between the next generation WLAN system and the existing WLAN system is a question.

In an IEEE802.11 protocol of the existing WLAN system, a media access control (MAC) layer uses a carrier sense multiple access with collision avoidance (CSMA/CA) protocol to ensure backward compatibility. In the IEEE802.11g protocol of the WLAN system, a Clear To Send-to-self (CTS-to-self) mechanism and a Request To Send/Clear To Send (RTS/CTS) mechanism are used to ensure backward compatibility during data transmission and to avoid a conflict between channels. The CTS-to-self mechanism is a mechanism over a MAC layer, which is used to protect a frame sequence from interferences of an adjacent station at an initiating end. In a CTS-to-self mode, when preparing to use a channel, a station in a protocol transmits a CTS frame firstly, where a receiving address of the frame is set to its own MAC address, a duration field thereof is set to its own MAC address, and the "duration" field is set to the difference of an estimated sequence time length and a time length of the CTS frame itself, which indicates how much time a station currently using a physical medium will take a wireless link subsequently. The CTS frame is transmitted at a basic rate, which is compatible with a conventional 802.11b station and can be identified by all stations in the network; other stations that sense the CTS frame update their own network allocation vector (NAV) values based on this, and remain silent during this period of time. The RTS/CTS mechanism is another alternative protection mechanism, which is used to protect a frame sequence from interferences of an adjacent station at an initiating end and a receiving end. The initiating end transmits an RTS frame, and the receiving end replies with a CTS frame after receiving the RTS frame. Relatively speaking, when the RTS/CTS mechanism is used, two additional control frames need to be exchanged before each data transmission is performed. However, both of the transmission mechanisms allow only one station to access and transmit data during data transmission at one time. Thus, new efficient technologies such as the OFDMA and the UL MU-MIMO introduced in the next generation WLAN protocol cannot be used, which is unfavorable for improvement of network performance.

SUMMARY

Embodiments of the present invention provide a method and an apparatus for establishing a transmission mode, which ensure backward compatibilities of an existing WLAN system and a next generation WLAN system, realize introduction of a new technology in the next generation WLAN protocol during data transmission, and improve network performance.

Embodiments of the present invention use the following technical solutions:

In a first aspect, a method for establishing a transmission mode is provided, including:

transmitting, by an access point (AP), a first Clear To Send frame to a first station (STA), to enable the first STA to set duration of a network allocation vector (NAV) of the first STA and remain a silent state when the AP communicates with a second STA;

transmitting, by the AP, the first Clear To Send frame to the second STA, to enable the second STA to process a Green Phase operation; and communicating, by the AP, with the second STA within a Green Phase period.

In a first possible implementation, with reference to the first aspect, after the transmitting the first Clear To Send frame to the second STA, to enable the second STA to process the Green Phase operation, further including:

transmitting the first Clear To Send frame to a third STA, to enable the third STA to set duration of an NAV of the third STA and remain a silent state when the AP communicates with the second STA.

In a second possible implementation, with reference to the first aspect or the first possible implementation, the first Clear To Send frame is a Clear To Send-to-self-advanced (CTS-to-self-advanced) frame, the transmitting the first Clear To Send frame to the second STA, to enable the second STA to process the Green Phase operation, including:

transmitting the CTS-to-self-advanced frame to the second STA, to enable the second STA to open the Green Phase and set duration of communications of the Green Phase.

In a third possible implementation, with reference to the first aspect, before the transmitting, by the AP, the first Clear To Send frame to the first station STA, to enable the first STA to set duration of the NAV of the first STA and remain the silent state when the AP communicates with the second STA, further including:

transmitting a Green-Phase-Setup frame to the second STA, to enable the second STA to open the Green Phase, or open the Green Phase and set duration of communications of the Green Phase.

In a fourth possible implementation, with reference to the third possible implementation, the first Clear To Send frame is a Clear To Send-to-self (CTS-to-self) frame, the transmitting the first Clear To Send frame to the second STA, to enable the second STA to process the Green Phase operation, including:

transmitting the CTS-to-self frame to the second STA, to enable the second STA to set the duration of the communications of the Green Phase if the second STA opens the Green Phase, or perform no treatment after the second STA opens the Green Phase and sets the duration of the communications of the Green Phase.

In a fifth possible implementation, with reference to the first possible implementation, before the transmitting, by the AP, the first Clear To Send frame to the first STA, to enable the first STA to set the duration of the NAV of the first STA and remain the silent state when the AP communicates with the second STA, further including:

transmitting the Green-Phase-Setup frame to the second STA, to enable the second STA to open the Green Phase, or open the Green Phase and set duration of communications of the Green Phase; and transmitting the Green-Phase-Setup frame to the third STA.

In a sixth possible implementation, with reference to the fifth possible implementation, the first Clear To Send frame is a CTS-to-self frame, the transmitting the first Clear To Send frame to the second STA, to enable the second STA to process the Green Phase operation, including:

transmitting the CTS-to-self frame to the second STA, to enable the second STA to set the duration of the communications of the Green Phase if the second STA opens the Green Phase, or perform no treatment after the second STA opens the Green Phase and sets the duration of the communications of the Green Phase.

In a seventh possible implementation, with reference to the first aspect, the first Clear To Send frame is a CTS-to-self frame, the transmitting the first Clear To Send frame to the second STA, to enable the second STA to process the Green Phase operation, including:

transmitting the CTS-to-self frame to the second STA, to enable the second STA to set duration of an NAV of the second STA.

In an eighth possible implementation, with reference to the seventh possible implementation, after the transmitting the CTS-to-self frame to the second STA, to enable the second STA to set the duration of the NAV of the second STA, further including:

transmitting a Green-Phase-Setup frame to the second STA, to enable the second STA to cancel the duration of the NAV of the second STA, open the Green Phase and set duration of communications of the Green Phase.

In a ninth possible implementation, with reference to the first possible implementation, the first Clear To Send frame is a CTS-to-self frame, the transmitting the first Clear To Send frame to the second STA, to enable the second STA to process the Green Phase operation, including:

transmitting the CTS-to-self frame to the second STA, to enable the second STA sets duration of an NAV of the second STA.

In a tenth possible implementation, with reference to the ninth possible implementation, after the transmitting the first Clear To Send frame to the third STA, to enable the third STA to set the duration of the NAV of the third STA and remain the silent state when the AP communicates with the second STA, further including:

transmitting a Green-Phase-Setup frame to the second STA, to enable the second STA to cancel the duration of the NAV of the second STA, open the Green Phase and set duration of communications of the Green Phase; and transmitting the Green-Phase-Setup frame to the third STA.

In a second aspect, a method for establishing a transmission mode is provided, including:

receiving, by a first station (STA), a first Clear To Send frame transmitted by an access point (AP);

setting duration of a network allocation vector (NAV) of the first STA according to the first Clear To Send frame, and remaining a silent state when the AP communicates with a second STA.

In a first possible implementation, with reference to the second aspect, the first Clear To Send frame is: a Clear To Send-to-self-advanced (CTS-to-self-advance) frame or a Clear To Send-to-self (CTS-to-self) frame.

In a third aspect, a method for establishing a transmission mode is provided, including:

receiving, by a second station (STA), a first Clear To Send frame transmitted by an access point (AP);

processing a Green Phase operation according to the first Clear To Send frame; and communicating with the AP within a Green Phase period.

In a first possible implementation, with reference to the third aspect, the first Clear To Send frame is a Clear To Send-to-self-advanced (CTS-to-self-advanced) frame, the processing the Green Phase operation according to the first Clear To Send frame includes:

opening the Green Phase according to the CTS-to-self-advanced frame and setting duration of communications of the Green Phase.

In a second possible implementation, with reference to the third aspect, before the receiving, by the second STA, the first Clear To Send frame transmitted by the AP, further including:

receiving a Green-Phase-Setup frame transmitted by the AP;

opening the Green Phase according to the Green-Phase-Setup frame, or opening the Green Phase and setting duration of communications of the Green Phase.

In a third possible implementation, with reference to the second possible implementation, the first Clear To Send frame is a Clear To Send-to-self (CTS-to-self) frame, the processing the Green Phase operation according to the first Clear To Send frame includes:

if the second STA opens the Green Phase, then setting, by the new STA, the duration of the communications of the Green Phase;

or, after the second STA opens the Green Phase and sets the duration of the communications of the Green Phase, performing no treatment.

In a fourth possible implementation, with reference to the third aspect, the first Clear To Send frame is a CTS-to-self frame, the processing the Green Phase operation according to the first Clear To Send frame includes:

setting duration of an NAV of the second STA according to the CTS-to-self frame.

In a fifth possible implementation, with reference to the fourth possible implementation, after the setting the duration of the NAV of the second STA according to the CTS-to-self frame, further including:

receiving a Green-Phase-Setup frame transmitted by the AP;

canceling the duration of the NAV of the second STA according to the Green-Phase-Setup frame, opening the Green Phase and setting duration of communications of the Green Phase.

In a fourth aspect, a method for establishing a transmission mode is provided, including:

receiving, by a third station (STA), a first Clear To Send frame transmitted by an access point (AP);

setting duration of an NAV of the third STA according to the first Clear To Send frame, and remaining a silent state when the AP communicates with a second STA.

In a first possible implementation, with reference to the fourth aspect, the first Clear To Send frame is a CTS-to-self frame, before the receiving, by the third STA, the first Clear To Send frame transmitted by the access AP, further including:

receiving, a Green-Phase-Setup frame transmitted by the AP.

In a second possible implementation, with reference to the fourth aspect, after the receiving, by the third STA, the Clear To Send-to-self (CTS-to-self) frame transmitted by the AP, further including:

receiving a Green-Phase-Setup frame transmitted by the AP.

In a fifth aspect, a wireless network access point AP is provided, including:

a first transmitting unit, configured to transmit a first Clear To Send frame to a first station (STA), to enable the first STA to set duration of a network allocation vector NAV of the first STA and remain a silent state when the AP communicates with a second STA;

the first transmitting unit is further configured to transmit the first Clear To Send frame to the second STA, to enable the second STA to process a Green Phase operation; and a communicating unit, configured to communicate with the second STA within a Green Phase period.

In a first possible implementation, with reference to the fifth aspect, the first transmitting unit is further configured to transmit the first Clear To Send frame to a third STA, to enable the third STA to set duration of an NAV of the third STA and remain a silent state during communications with the second STA.

In a second possible implementation, with reference to the fifth aspect or the first possible implementation, the first Clear To Send frame is a Clear To Send-to-self-advanced (CTS-to-self-advanced) frame, the first transmitting unit includes:

a first transmitting subunit, configured to transmit the CTS-to-self-advanced frame to the second STA, to enable the second STA to open the Green Phase and set duration of communications of the Green Phase.

In a third possible implementation, with reference to the fifth aspect, the AP further includes:

a second transmitting unit, configured to transmit a Green-Phase-Setup frame to the second STA, to enable the second STA to open the Green Phase, or open the Green Phase and set duration of communications of the Green Phase.

In a fourth possible implementation, with reference to the third possible implementation, the first Clear To Send frame is a Clear To Send-to-self (CTS-to-self) frame, the first transmitting unit further includes:

a second transmitting subunit, configured to transmit the CT S-to-self frame to the second STA, to enable a new STA to set the duration of the communications of the Green Phase if the second STA opens the Green Phase, or perform no treatment after the second STA opens the Green Phase and sets the duration of the communications of the Green Phase.

In a fifth possible implementation, with reference to the first possible implementation, the second transmitting unit is further configured to:

transmit the Green-Phase-Setup frame to the second STA, to enable the second STA to open the Green Phase, or open the Green Phase and set duration of communications of the Green Phase; and transmit the Green-Phase-Setup frame to the third STA.

In a sixth possible implementation, with reference to the fifth possible implementation, the first Clear To Send frame is a CTS-to-self frame, the second transmitting subunit is further configured to transmit the CTS-to-self frame to the second STA, to enable the second STA to set the duration of the communications of the Green Phase if the second STA opens the Green Phase, or perform no treatment after the second STA opens the Green Phase and sets the duration of the communications of the Green Phase.

In a seventh possible implementation, with reference to the fifth aspect, the first Clear To Send frame is a CTS-to-self frame, the first transmitting unit further includes:

a third transmitting subunit, configured to transmit the CTS-to-self frame to the second STA, to enable the second STA to set duration of an NAV of the second STA.

In an eighth possible implementation, with reference to the seventh possible implementation, the second transmitting unit is further configured to transmit a Green-Phase-Setup frame to the second STA, to enable the second STA to cancel the duration of the NAV of the second STA, open the Green Phase and set duration of communications of the Green Phase.

In a ninth possible implementation, with reference to the first possible implementation, the first Clear To Send frame is a CTS-to-self frame, the third transmitting subunit is further configured to transmit the CTS-to-self frame to the second STA, to enable the second STA to set duration of an NAV of the second STA.

In a tenth possible implementation, with reference to the ninth possible implementation, the second transmitting unit is further configured to:

transmit a Green-Phase-Setup frame to the second STA, to enable the second STA to cancel the duration of the NAV of the second STA, open the Green Phase and set duration of communications of the Green Phase; and transmit the Green-Phase-Setup frame to the third STA.

In a sixth aspect, a terminal equipment (STA) is provided, including:

a receiving unit, configured to receive a first Clear To Send frame transmitted by an access point (AP);

a processing unit, configured to set duration of a network allocation vector NAV according to the first Clear To Send frame, and remain a silent state when the AP communicates with another STA.

In a first possible implementation, with reference to the sixth aspect, the first Clear To Send frame is: a Clear To Send-to-self-advanced (CTS-to-self-advance) frame or a Clear To Send-to-self (CTS-to-self) frame.

In a seventh aspect, a terminal equipment (STA) is provided, including:

a first receiving unit, configured to receive a first Clear To Send frame transmitted by an access point (AP);

a processing unit, configured to process a Green Phase operation according to the first Clear To Send frame; and a communicating unit, configured to communicate with the AP within a Green Phase period.

In a first possible implementation, with reference to the seventh aspect, the first Clear To Send frame is a Clear To Send-to-self-advanced (CTS-to-self-advanced) frame, the processing unit includes:

a first processing subunit, configured to open the Green Phase according to the CTS-to-self-advanced frame and set duration of communications of the Green Phase.

In a second possible implementation, with reference to the first possible implementation, the STA further includes:

a second receiving unit, configured to receive a Green-Phase-Setup frame transmitted by the AP;

the processing unit is further configured to open the Green Phase according to the Green-Phase-Setup frame, or open the Green Phase and set duration of communications of the Green Phase.

In a third possible implementation, with reference to the second possible implementation, the first Clear To Send frame is a Clear To Send-to-self (CTS-to-self) frame, the processing unit further includes:

a second processing subunit, configured to set the duration of the communications of the Green Phase if the Green Phase is opened;

or, the second processing subunit is further configured to perform no treatment after the Green Phase is opened and the duration of the communications of the Green Phase is set.

In a fourth possible implementation, with reference to the seventh aspect, the first Clear To Send frame is a CTS-to-self frame, the processing unit further includes:

a third processing subunit, configured to set duration of an NAV according to the CTS-to-self frame.

In a fifth possible implementation, with reference to the fourth possible implementation, the second receiving unit is further configured to receive a Green-Phase-Setup frame transmitted by the AP;

the processing unit is further configured to cancel the duration of the NAV according to the Green-Phase-Setup frame, open the Green Phase and set duration of communications of the Green Phase.

In an eighth aspect, a terminal equipment (STA) is provided, including:

a first receiving unit, configured to receive a Clear To Send-to-self (CTS-to-self) frame transmitted by an access point (AP); and a processing unit, configured to set duration of an NAV of the second new STA according to the CTS-to-self frame, and remain a silent state when the AP communicates with the first new STA.

In a first possible implementation, with reference to the eighth aspect, the STA further includes:

a second receiving unit, configured to receive a Green-Phase-Setup frame transmitted by the AP.

In a second possible implementation, with reference to the eighth aspect, the second receiving unit is further configured to receive a Green-Phase-Setup frame transmitted by the AP.

According to a method and an apparatus for establishing a transmission mode provided in embodiments of the present invention, by means of using a green phase protocol for communications during data transmission, backward compatibilities of an existing WLAN system and a next generation WLAN system is ensured, introduction of a new technology in the next generation WLAN protocol is realized during data transmission, and network performance is improved.

BRIEF DESCRIPTION OF DRAWINGS

In order to make technical solutions in embodiments of the present invention or the prior art clearer, accompanying drawings used in the description of the embodiments of the present invention or the prior art will be briefly described hereunder. Obviously, the described drawings are merely some embodiments of present invention. For persons of ordinary skill in the art, other drawings may be obtained based on these drawings without any creative effort.

DESCRIPTION OF EMBODIMENTS

Technical solutions in embodiments of the present invention will be described clearly and completely hereunder with reference to the accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

Figure 1:
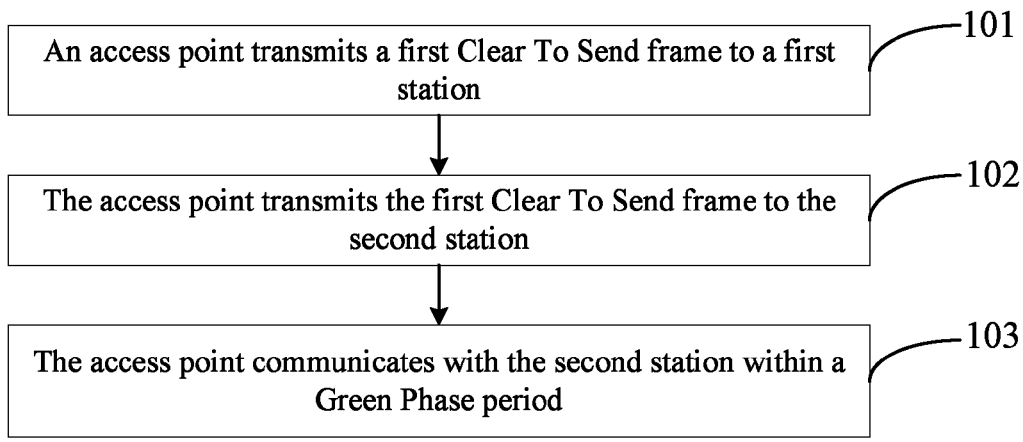
FIG. 1 is a schematic flow chart of a method for establishing a transmission mode according to an embodiment of the present invention.

An embodiment of the present invention provides a method for establishing a transmission mode, reference may be made to FIG. 1, including:

101, an access point (AP) transmits a first Clear To Send frame to a first station (STA), so that the first STA sets duration of a network allocation vector (NAV for short) of the first STA and remains a silent state when the AP communicates with a second STA.

A first station sets duration of an NAV to notify other stations in a same system that a channel has been occupied during this period, other channels cannot compete for or occupy the channel during this period, thus when the stations communicate with an access point, a conflict between the stations can be avoided. Moreover, the first STA does not perform communications during the set period, which can ensure data transmission between the access point and a second station, and avoid impacts on the second station. The duration of the NAV of the first STA and duration of communications of a green phase are the same period.

102, the AP transmits the first Clear To Send frame to the second STA, so that the second STA processes a Green Phase operation.

The processing the green phase operation by the second STA includes: opening the green phase, opening the green phase and setting the duration of the communications of the green phase, or setting duration of an NAV of the second STA.

103, the AP communicates with the second STA within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 2:
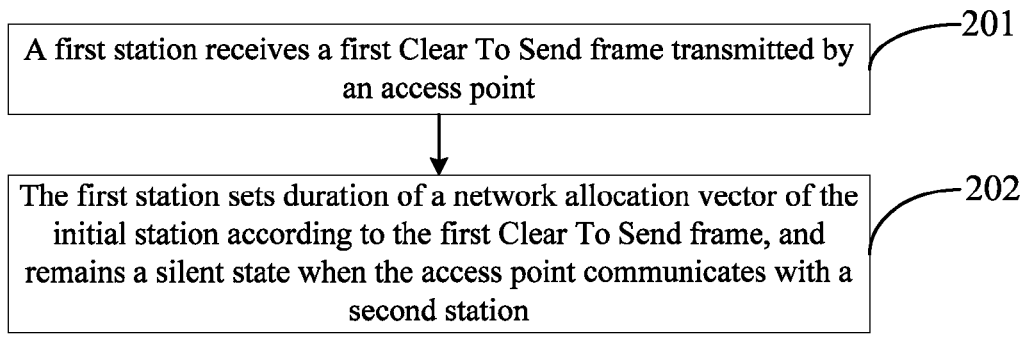
FIG. 2 is a schematic flow chart of another method for establishing a transmission mode according to an embodiment of the present invention.

An embodiment of the present invention provides a method for establishing a transmission mode, reference may be made to FIG. 2, including:

201, a first station STA receives a first Clear To Send frame transmitted by an access point AP.

202, the first STA sets duration of a network allocation vector NAV of the first STA according to the first Clear To Send frame, and remains a silent state when the AP communicates with a second STA.

The duration of the NAV of the first STA and the duration of communications of a green phase are the same period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 3:
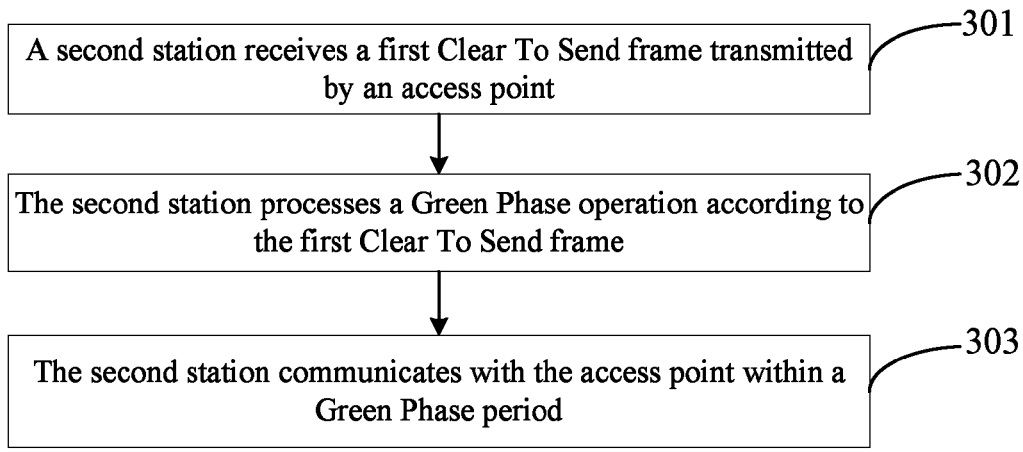
FIG. 3 is a schematic flow chart of still another method for establishing a transmission mode according to an embodiment of the present invention.

An embodiment of the present invention provides a method for establishing a transmission mode, reference may be made to FIG. 3, including:

301, a second STA receives a first Clear To Send frame transmitted by an access point AP.

302, the second STA processes a Green Phase operation according to the first Clear To Send frame.

The processing the green phase operation by the second STA includes: opening the green phase, opening the green phase and setting the duration of the communications of the green phase, or setting duration of an NAV of the second STA.

303, the second STA communicates with the AP by using a next generation WLAN protocol within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 4:
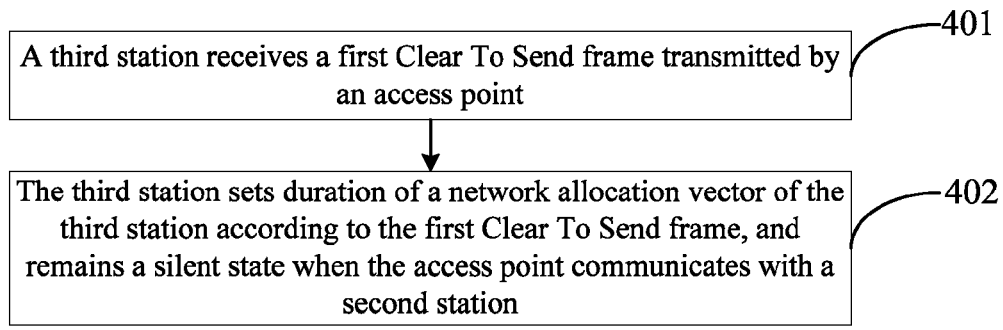
FIG. 4 is a schematic flow chart of still another method for establishing a transmission mode according to an embodiment of the present invention.

An embodiment of the present invention provides a method for establishing a transmission mode, reference may be made to FIG. 4, including:

401, a third station STA receives a first Clear To Send frame transmitted by an access point AP.

402, the third STA sets duration of an NAV of the third STA according to the first Clear To Send frame, and remains a silent state when the AP communicates with a second STA.

The third STA sets its own duration of a network allocation vector, and remains a silent state when the AP communicates with a second STA, thus an impact on the second STA can be avoided when the second STA performs data transmission with the access point, and superiority of a new technology in a next generation WLAN system is exploited. The duration of the NAV of the third STA and duration of communications of a green phase are the same period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 5:
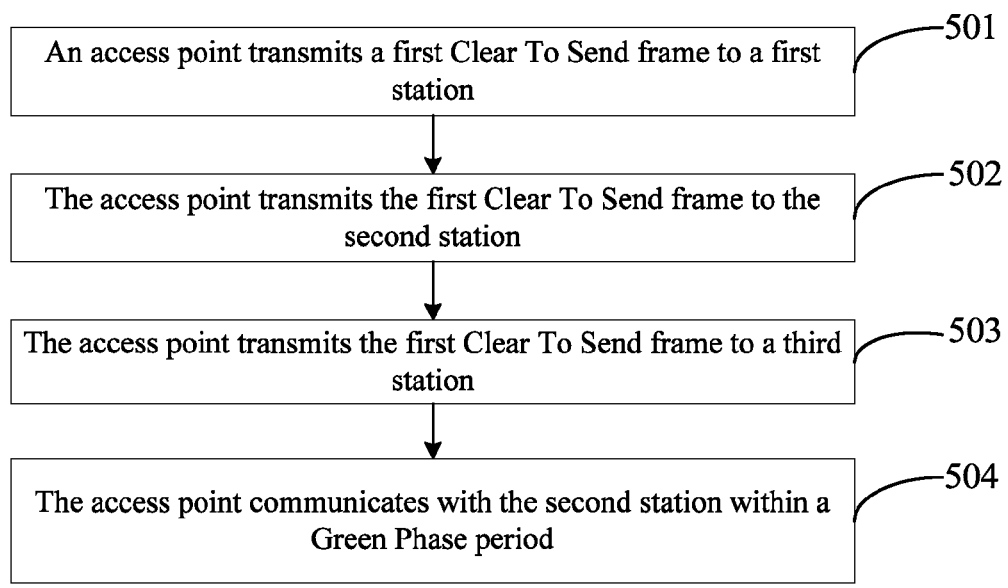
FIG. 5 is a schematic flow chart of a method for establishing a transmission mode according to another embodiment of the present invention.

An embodiment of the present invention provides a method for establishing a transmission mode, new STAs in a network are divided into two groups, reference may be made to FIG. 5, including:

501, an access point AP transmits a first Clear To Send frame to a first station STA, so that the first STA sets duration of a network allocation vector NAV of the first STA and remains a silent state when the AP communicates with a second STA.

502, the AP transmits the first Clear To Send frame to the second STA, so that the second STA processes a Green Phase operation.

503, the AP transmits the first Clear To Send frame to a third STA, so that the third STA sets duration of an NAV of the third STA and remains a silent state when the AP communicates with the second STA.

504, the AP communicates with the second STA within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 6:
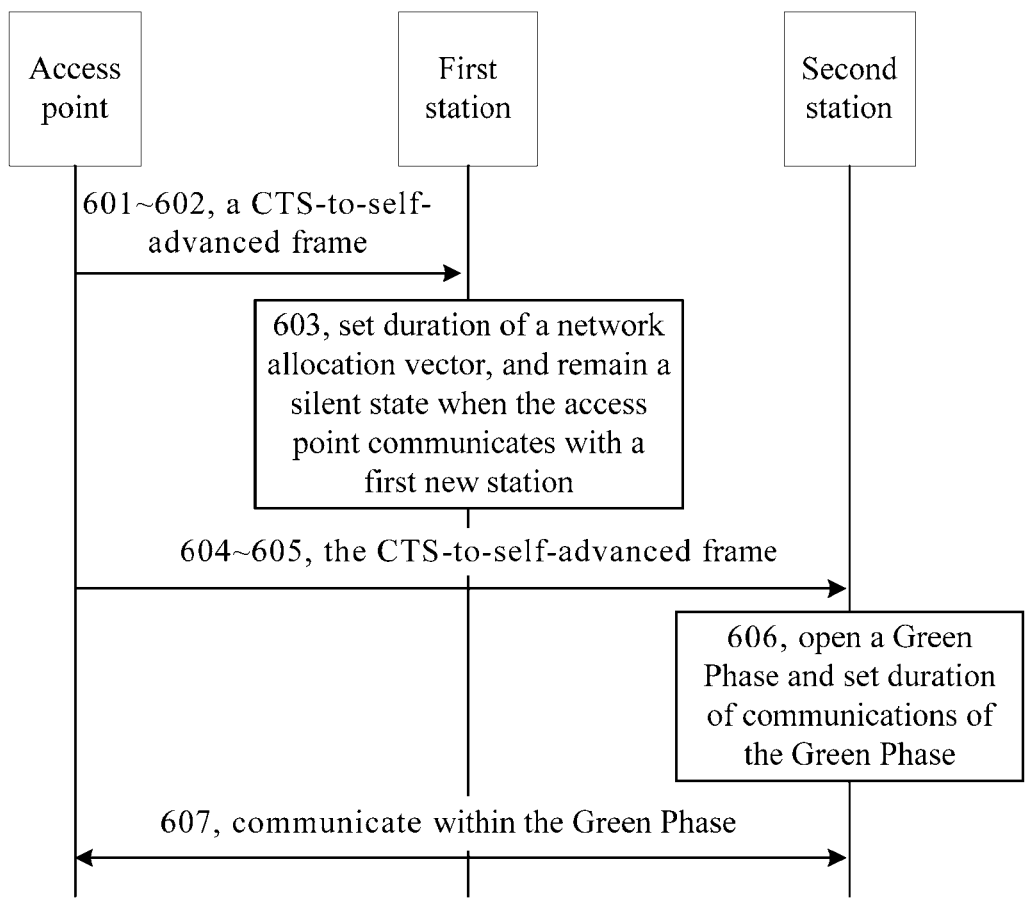
FIG. 6 is a schematic flow chart of another method for establishing a transmission mode according to another embodiment of the present invention.

An embodiment of the present invention provides a method for establishing a transmission mode, the first Clear To Send frame is a Clear To Send-to-self-advanced (CTS-to-self-advanced for short) frame, reference may be made to FIG. 6, the method includes:

601, an AP transmits a CTS-to-self-advanced frame to a first station STA.

The CTS-to-self-advanced frame is an improved frame of a CTS-to-self frame, a Green Phase opened flag is added in the CTS-to-self-advanced frame, and the frame may be identified by all rated stations in the network. However, a position of a Green Phase opened flag field in the frame is not defined herein. The opened flag may use any indicating manner that can be identified by a new STA.

The transmission of the CTS-to-self-advanced frame from the AP to the first station, may be performed by the AP after detecting that channel vacancy duration exceeds a first preset time. In this embodiment, the first preset time may be a point coordination function interframe space (PIFS for short), certainly, the first preset time is not limited thereto, and an appropriate time length may be selected according to specific implement environments.

602, the first STA receives the CTS-to-self-advanced frame transmitted by the AP.

603, the first STA sets duration of an NAV of the first STA according to the CTS-to-self-advanced frame, and remains a silent state when the AP communicates with a second STA.

The first STA is a station which only supports an existing WLAN communication protocol, and the second STA is a station which supports both an existing WLAN protocol and a next generation WLAN communication protocol. When the AP communicates with the second STA, the first STA remains a silent state, thus interferences to the AP are avoided when the AP communicates with the second STA, and normal communications between the AP and the second STA is ensured.

604, the AP transmits the CTS-to-self-advanced frame to the second STA.

605, the second STA receives the CTS-to-self-advanced frame transmitted by the AP.

606, the second STA opens a Green Phase and sets duration of communications of the Green Phase according to the CTS-to-self-advanced frame.

Specifically, the duration of the communications of the Green Phase is set according to a duration field in the CTS-to-self-advanced frame.

607, the AP communicates with the second STA within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 7:
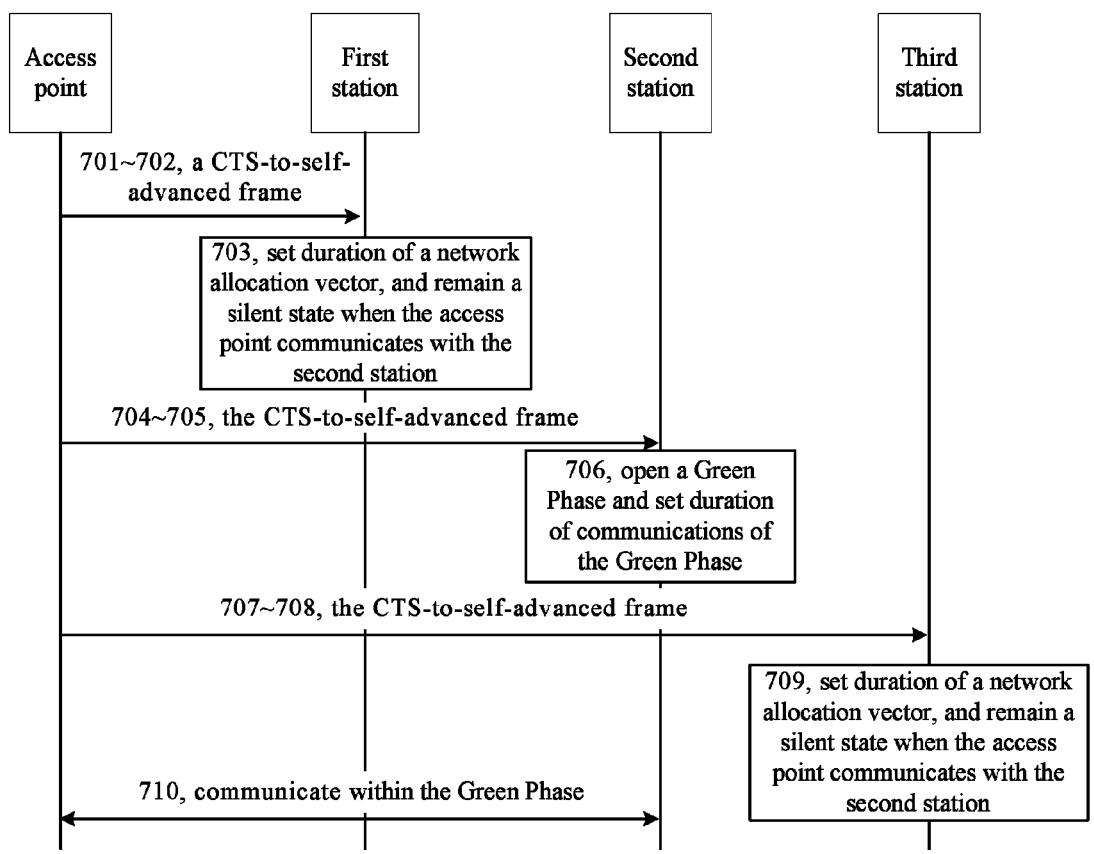
FIG. 7 is a schematic flow chart of still another method for establishing a transmission mode according to another embodiment of the present invention.

An embodiment of the present invention provides a method for establishing a transmission mode, the first Clear To Send frame is a CTS-to-self-advanced frame, new STAs in a network are divided into two groups, reference may be made to FIG. 7, the method includes:

701, an AP transmits a CTS-to-self-advanced frame to a first station STA.

702, the first STA receives the CTS-to-self-advanced frame transmitted by the AP.

703, the first STA sets duration of an NAV of the first STA according to the CTS-to-self-advanced frame, and remains a silent state when the AP communicates with a second STA.

704, the AP transmits the CTS-to-self-advanced frame to the second STA.

705, the second STA receives the CTS-to-self-advanced frame transmitted by the AP.

706, the second STA opens a Green Phase and sets duration of communications of the Green Phase according to the CTS-to-self-advanced frame.

The transmission of the CTS-to-self-advanced frame from the AP to the first station and the second STA, may be performed by the AP after detecting that channel vacancy duration exceeds a first preset time. In this embodiment, the first preset time may be a point coordination function interframe space (PIFS), certainly, the first preset time is not limited thereto, and an appropriate time length may be selected according to specific implement environments.

Specifically, the duration of the communications of the Green Phase is set according to a duration field in the CTS-to-self-advanced frame.

707, the AP transmits the CTS-to-self-advanced frame to a third STA.

The third STA is a station which supports both an existing WLAN protocol and a next generation WLAN communication protocol.

708, the third STA receives the CTS-to-self-advanced frame transmitted by the AP.

709, the third STA sets duration of an NAV of the third STA according to the CTS-to-self-advanced frame, and remains a silent state when the AP communicates with the second STA.

710, the AP communicates with the second STA within a Green Phase period.

Specifically, in embodiments of the present invention, the CTS-to-self-advanced frame has a field that identifies the second STA and the third STA, and it is specified in the field that the Green Phase will be opened only when the second STA receives the frame.

The first STA and the third STA set their own duration of NAVs, and remain a silent state when the AP communicates with the second STA, thus interferences to the AP can be avoided when the AP communicates with the second STA, and normal communications between the AP and the second STA is ensured.

Reference may be made to the above embodiments for an explanation about the CTS-to-self-advanced frame in steps 701~706, which will not be repeated herein.

According to a method for establishing a transmission mode provided in an embodiment of the present invention, by means of using a green phase protocol for communications during data transmission, backward compatibilities of an existing WLAN system and a next generation WLAN system are ensured, performance advantages of a new technology in the next generation WLAN protocol are exploited, introduction of the new technology in the next generation WLAN protocol is realized during data transmission, and meanwhile network performance is improved.

Figure 8:
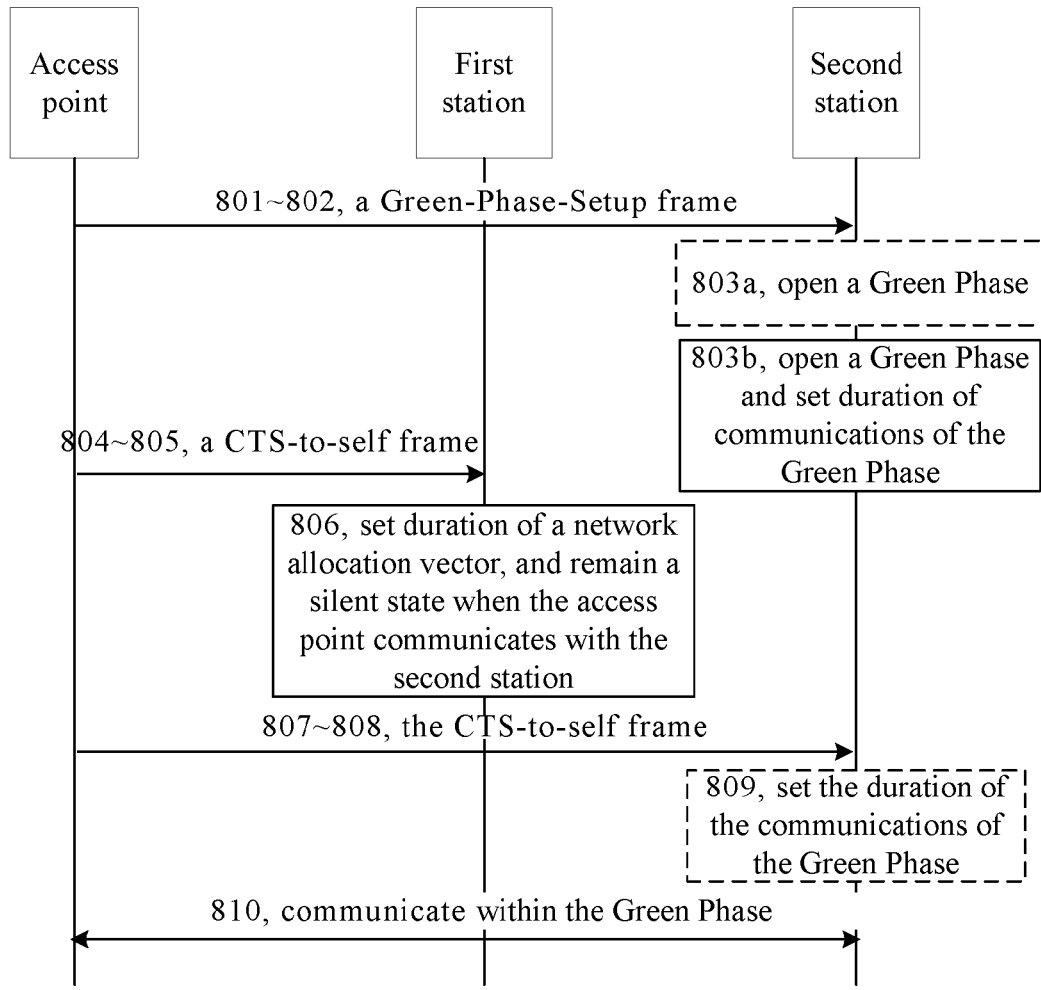
FIG. 8 is a schematic flow chart of still another method for establishing a transmission mode according to another embodiment of the present invention.

An embodiment of the present invention provides a method for establishing a transmission mode, the first Clear To Send frame is a Clear To Send-to-self (CTS-to-self) frame, reference may be made to FIG. 8, the method includes:

801, an AP transmits a Green-Phase-Setup frame to a second STA.

The transmission of the Green-Phase-Setup frame from the AP to the second STA, may be performed by the AP after detecting that channel vacancy duration exceeds a first preset time. In this embodiment, the first preset time may be a point coordination function interframe space (PIFS), certainly, the first preset time is not limited thereto, and an appropriate time length may be selected according to specific implement environments.

The second STA in a network can identify the Green-Phase-Setup frame, whereas a first STA cannot identify the Green-Phase-Setup frame.

802, the second STA receives the Green-Phase-Setup frame transmitted by the AP.

803a, the second STA opens a Green Phase according to the Green-Phase-Setup frame.

803b, the second STA opens a Green Phase and sets duration of communications of the Green Phase according to the Green-Phase-Setup frame.

804, the AP transmits a CTS-to-self frame to a first station STA.

The transmission of the CTS-to-self frame from the AP to the first STA and the second STA, may be performed by the AP after detecting that channel vacancy duration exceeds a second preset time. In this embodiment, the second preset time may be a short interframe space (SIFS), certainly, the second preset time is not limited thereto, and an appropriate time length may be selected according to specific implement environments. A time length of the first preset time is greater than a time length of the second preset time.

805, the first STA receives the CTS-to-self frame transmitted by the AP.

806, the first STA sets duration of a network allocation vector NAV of the first STA according to the CTS-to-self frame, and remains a silent state when the AP communicates with the second STA.

The first STA sets its own duration of the NAV according to a duration field in the CTS-to-self frame.

807, the AP transmits the CTS-to-self frame to the second STA.

808, the second STA receives the CTS-to-self frame transmitted by the AP.

If the step 803a is performed previously, where the second STA has opened the Green Phase, then perform steps 809~810; If the step 803b is performed previously, where the second STA opens the Green Phase and sets the duration of the communications of the Green Phase, then perform step 810;

809, the second STA sets the duration of the communications of the Green Phase according to the CTS-to-self frame.

810, the AP communicates with the second STA within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 9:
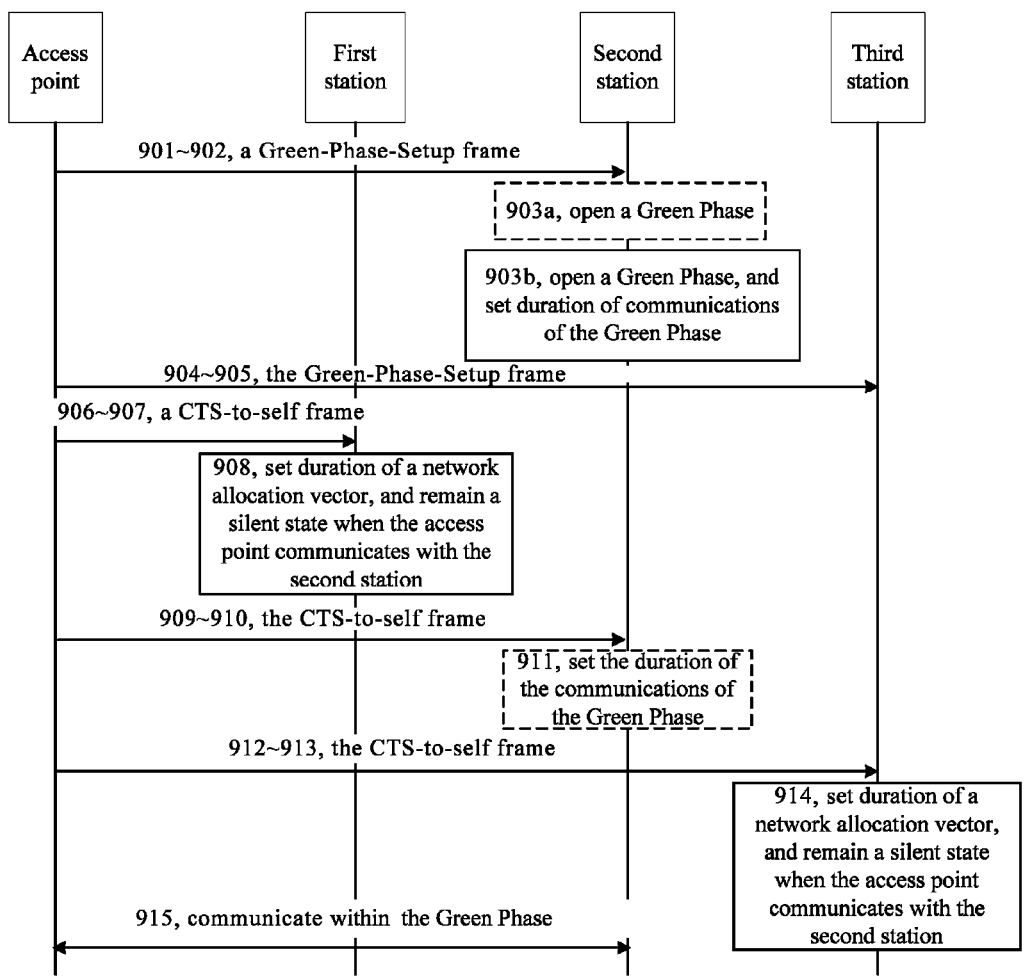
FIG. 9 is a schematic flow chart of a method for establishing a transmission mode according to still another embodiment of the present invention.

An embodiment of the present invention provides a method for establishing a transmission mode, the first Clear To Send frame is a CTS-to-self frame, new STAs in a network are divided into two groups, reference may be made to FIG. 9, the method includes:

901, an AP transmits a Green-Phase-Setup frame to a second STA.

902, the second STA receives the Green-Phase-Setup frame transmitted by the AP.

903a, the second STA opens a Green Phase according to the Green-Phase-Setup frame.

903b, the second STA opens a Green Phase according to the Green-Phase-Setup frame, and sets duration of communications of the Green Phase.

904, the AP transmits the Green-Phase-Setup frame to a third STA.

The transmission of the Green-Phase-Setup frame from the AP to the second STA and the third STA, may be performed by the AP after detecting that channel vacancy duration exceeds a first preset time. In this embodiment, the first preset time may be a point coordination function interframe space (PIFS), certainly, the first preset time is not limited thereto, and an appropriate time length may be selected according to specific implement environments.

The second STA and the third STA in the network can identify the Green-Phase-Setup frame, whereas a first STA cannot identify the Green-Phase-Setup frame.

905, the third STA receives the Green-Phase-Setup frame transmitted by the AP.

906, the AP transmits a CTS-to-self frame to a first station STA.

907, the first STA receives the CTS-to-self frame transmitted by the AP.

908, the first STA sets duration of a network allocation vector NAV of the first STA according to the CTS-to-self frame, and remains a silent state when the AP communicates with the second STA.

Specifically, the first STA may set its own duration of the NAV according to a duration field in the CTS-to-self frame.

909, the AP transmits the CTS-to-self frame to the second STA.

910, the second STA receives the CTS-to-self frame transmitted by the AP.

If the step 903a is performed previously, where the second has opened the Green Phase, then perform steps 911~915; if the step 903b is performed previously, where the second STA opens the Green Phase and sets the duration of the communications of the Green Phase, then perform steps 912~915;

911, the second STA sets the duration of the communications of the Green Phase according to the CTS-to-self frame.

Specifically, the second STA may set the duration of the communications of the Green Phase according to a duration field in the CTS-to-self frame, and the third STA may set its own duration of an NAV according to the duration field in the CTS-to-self frame.

912, the AP transmits the CTS-to-self frame to the third STA.

The transmission of the CTS-to-self frame from the AP to the first STA, the second STA and the third STA, may be performed by the AP after detecting that channel vacancy duration exceeds a second preset time. In this embodiment, the second preset time may be a short interframe space (SIFS for short), certainly, the second preset time is not limited thereto, and an appropriate time length may be selected according to specific implement environments. A time length of the first preset time is greater than a time length of the second preset time.

913, the third STA receives the CTS-to-self frame transmitted by the AP.

914, the third STA sets duration of an NAV of the third STA according to the CTS-to-self frame, and remains a silent state when the AP communicates with the second STA.

915, the AP communicates with the second STA within a Green Phase period.

Specifically, in the embodiment of the present invention, the Green-Phase-Setup frame has a field that identifies the second STA and the third STA, and it is specified in the field that the Green Phase will be opened only when the second STA receives the Green-Phase-Setup frame, whereas the third STA performs no treatment after receiving the Green-Phase-Setup frame.

Reference may be made to descriptions in the above embodiments for an explanation about the first STA, the second STA and the third STA in the present invention, which will not be repeated in this embodiment and the following embodiments.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 10:
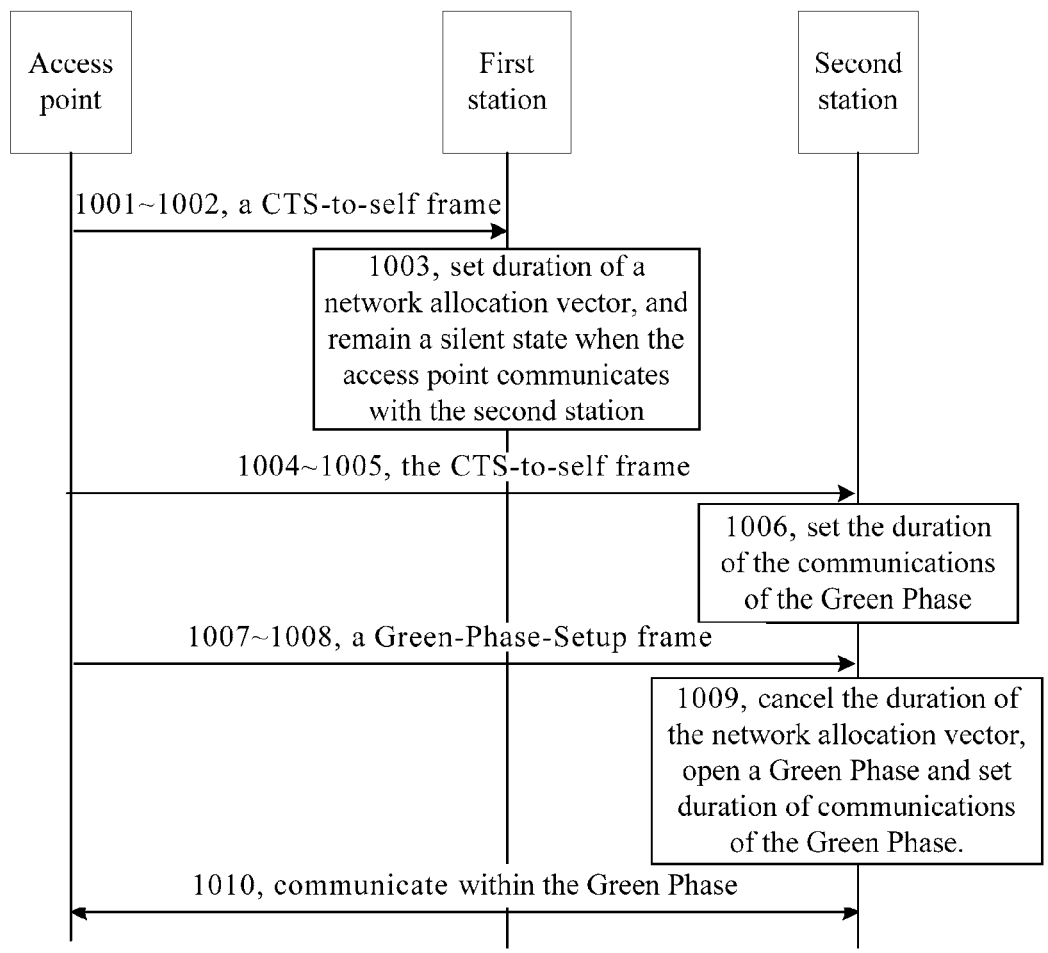
FIG. 10 is a schematic flow chart of another method for establishing a transmission mode according to still another embodiment of the present invention.

An embodiment of the present invention provides a method for establishing a transmission mode, the first Clear To Send frame is a CTS-to-self frame, reference may be made to FIG. 10, the method includes:

1001, an AP transmits a CTS-to-self frame to a first station STA.

1002, the first STA receives the CTS-to-self frame transmitted by the AP.

1003, the first STA sets duration of a network allocation vector NAV of the first STA according to the CTS-to-self frame, and remains a silent state when the AP communicates with a second STA.

1004, the AP transmits the CTS-to-self frame to the second STA.

The transmission of the CTS-to-self frame from the AP to the first station and the second STA, may be performed by the AP after detecting that channel vacancy duration exceeds a first preset time. In this embodiment, the first preset time may be a point coordination function interframe space (PIFS), certainly, the first preset time is not limited thereto, and an appropriate time length may be selected according to specific implement environments.

1005, the second STA receives the CTS-to-self frame transmitted by the AP.

1006, the second STA sets duration of an NAV of the second STA according to the CTS-to-self frame.

The first STA and the second STA set their own duration of NAVs according to a duration field in the CTS-to-self frame.

1007, the AP transmits a Green-Phase-Setup frame to the second STA.

The transmission of the Green-Phase-Setup frame from the AP to the second STA, may be performed by the AP after detecting that channel vacancy duration exceeds a second preset time. In this embodiment, the second preset time may be a short interframe space (SIFS for short), certainly, the second preset time is not limited thereto, and an appropriate time length may be selected according to specific implement environments. A time length of the first preset time is greater than a time length of the second preset time.

1008, the second STA receives the Green-Phase-Setup frame transmitted by the AP.

1009, the second STA cancels the duration of the NAV of the second STA according to the Green-Phase-Setup frame, opens a Green Phase and sets duration of communications of the Green Phase.

The second STA may set the duration of the communications of the Green Phase according to remaining duration of a current NAV or according to a duration field in the Green-Phase-Setup frame.

1010, the AP communicates with the second STA within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 11:
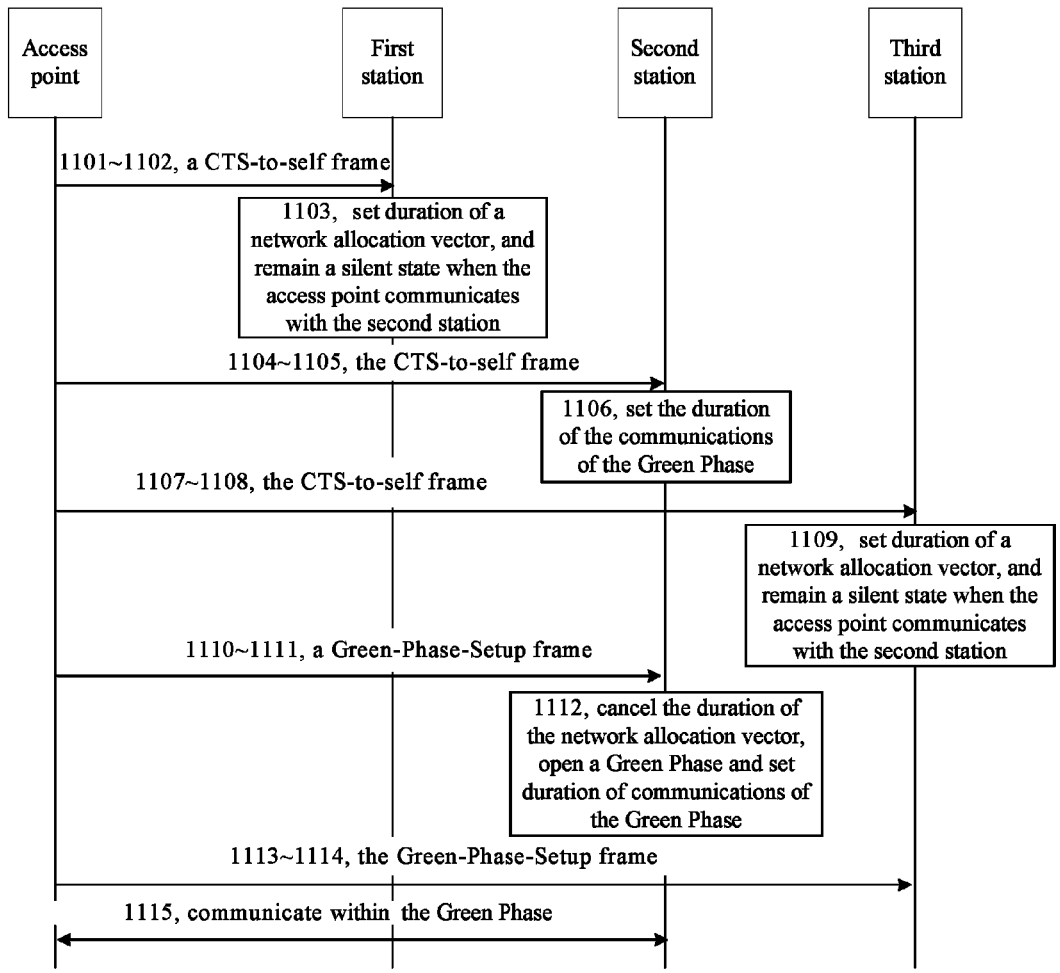
FIG. 11 is a schematic flow chart of still another method for establishing a transmission mode according to still another embodiment of the present invention.

An embodiment of the present invention provides a method for establishing a transmission mode, the first Clear To Send frame is a CTS-to-self frame, new STAs in a network are divided into two groups, reference may be made to FIG. 11, the method includes:

1101, an AP transmits a CTS-to-self frame to a first station STA.

1102, the first STA receives the CTS-to-self frame transmitted by the AP.

1103, the first STA sets duration of a network allocation vector NAV of the first STA according to the CTS-to-self frame, and remains a silent state when the AP communicates with a second STA.

1104, the AP transmits the CTS-to-self frame to the second STA.

1105, the second STA receives the CTS-to-self frame transmitted by the AP.

1106, the second STA sets duration of an NAV of the second STA according to the CTS-to-self frame.

1107, the AP transmits the CTS-to-self frame to a third STA.

The transmission of the CTS-to-self frame from the AP to the first STA, the second STA and the third STA, may be performed by the AP after detecting that channel vacancy duration exceeds a first preset time. In this embodiment, the first preset time may be a point coordination function interframe space (PIFS), certainly, the first preset time is not limited thereto, and an appropriate time length may be selected according to specific implement environments.

1108, the third STA receives the CTS-to-self frame transmitted by the AP.

1109, the third STA sets duration of an NAV of the third STA according to the CTS-to-self frame, and remains a silent state when the AP communicates with the second STA.

The first STA, the second STA and the third STA in a network may set their own duration of NAVs according to a duration field in the CTS-to-self frame.

1110, the AP transmits a Green-Phase-Setup frame to the second STA.

1111, the second STA receives the Green-Phase-Setup frame transmitted by the AP.

1112, the second STA cancels the duration of the NAV of the second STA according to the Green-Phase-Setup frame, opens a Green Phase and sets duration of communications of the Green Phase.

1113, the AP transmits the Green-Phase-Setup frame to the third STA.

The transmission of the Green-Phase-Setup frame from the AP to the second STA and the third STA, may be performed by the AP after detecting that channel vacancy duration exceeds a second preset time. In this embodiment, the second preset time may be a short interframe space (SIFS for short), certainly, the second preset time is not limited thereto, and an appropriate time length may be selected according to specific implement environments. A time length of the first preset time is greater than a time length of the second preset time.

Specifically, in the embodiment of the present invention, the Green-Phase-Setup frame has a field that identifies the second STA and the third STA, and it is specified in the field that the Green Phase will be opened only when the second STA receives the Green-Phase-Setup frame, whereas the third STA performs no treatment after receiving the Green-Phase-Setup frame.

1114, the third STA receives the Green-Phase-Setup frame transmitted by the AP.

1115, the AP communicates with the second STA within a Green Phase period.

According to a method for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

The CTS-to-self frame in embodiments of the present invention includes: a frame control field, a duration field, a receiving end address field and a frame check sequence FCS field; where, the frame control field is configured to indicate attribute information of the CTS-to-self frame; and the receiving end address field refers to an address of an STA receiving the CTS-to-self frame. In the embodiments corresponding to FIG. 8 and FIG. 9, the duration field is configured to indicate duration of a Green Phase period, in the embodiments corresponding to FIG. 9 and FIG. 11, the duration field is configured to indicate sum of duration of the Green Phase period, duration of the second preset time and transmission duration of the Green-Phase-Setup frame.

The PIFS is an interframe space specified in an existing wireless local area network standard. For instance, the time length is 30 us microsecond and a Slot time is 20 us as specified in IEEE 802.11b, the time length is 25 us and a Slot time is 9 us as specified in IEEE 802.11a, and the time length is 19 us or 30 us and a Slot time is 9 us or 20 us as specified in IEEE 802.11g, where the time length of the PIFS is equal to a sum of a time length of the SIFS and a time length of a Slot time.

The SIFS is a fixed value in an existing wireless local area network, for instance, the time length is 10 us as specified in the IEEE 802.11b, the time length is 16 us as specified in the IEEE 802.11a, and the time length is 10 us as specified in the IEEE 802.11g.

In the embodiment of the present invention, within a Green Phase period, an AP may use a next generation WLAN protocol to communicate with a second STA. The next generation WLAN protocol may be an orthogonal frequency division multiple access (OFDMA) technology and an uplink multiple user multiple-input multiple-output (UL MU-MIMO for short) technology. Certainly, the next generation WLAN protocol is not limited thereto, and may be a desirable technology according to specific implement environments.

Figure 12:
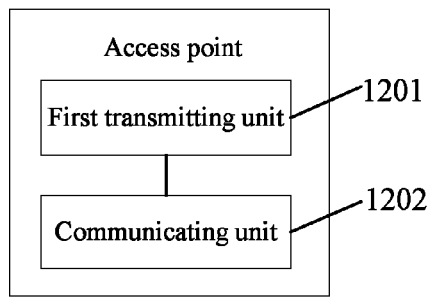
FIG. 12 is a schematic structural diagram of an access point according to an embodiment of the present invention.

An embodiment of the present invention provides an access point, which may be an access point AP in a wireless access network; reference may be made to FIG. 12, including a first transmitting unit 1201 and a communicating unit 1202.

The first transmitting unit 1201 is configured to transmit a first Clear To Send frame to a first station STA, so that the first STA sets duration of a network allocation vector NAV of the first STA and remains a silent state when the AP communicates with a second STA.

The first transmitting unit 1201 is further configured to transmit the first Clear To Send frame to the second STA, so that the second STA processes a Green Phase operation.

The communicating unit 1202 is configured to communicate with the second STA within a Green Phase period by using a next generation WLAN protocol.

According to an apparatus for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

In further, the AP provided in the embodiment of the present invention also includes:

the first transmitting unit 1201 is further configured to transmit the first Clear To Send frame to a third STA, so that the third STA sets duration of an NAV of the third STA and remains a silent state when the AP communicates with the second STA.

Figure 13:
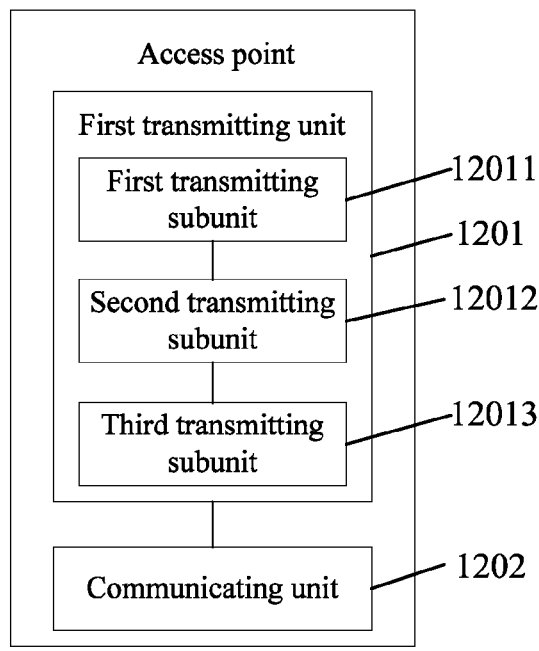
FIG. 13 is a schematic structural diagram of another access point according to an embodiment of the present invention.

In further, the first Clear To Send frame is a Clear To Send-to-self-advanced (CTS-to-self-advanced) frame, reference may be made to FIG. 13, the first transmitting unit 1201 includes: a first transmitting subunit 12011.

The first transmitting subunit 12011 is configured to transmit the CTS-to-self-advanced frame to the second STA, so that the second STA opens the Green Phase and sets duration of communications of the Green Phase.

Figure 14:
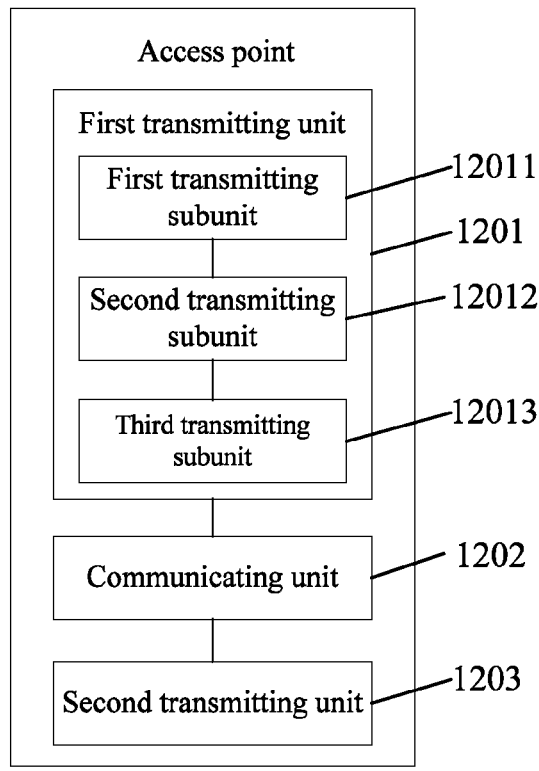
FIG. 14 is a schematic structural diagram of still another access point according to an embodiment of the present invention.

In further, reference may be made to FIG. 14, the AP also includes: a second transmitting unit 1203;

The second transmitting unit 1203 is configured to transmit a Green-Phase-Setup frame to the second STA, so that the second STA opens the Green Phase, or opens the Green Phase and sets duration of communications of the Green Phase.

In further, reference may be made to FIG. 13, the first transmitting unit also includes: a second transmitting subunit 12012.

The second transmitting subunit 12012 is configured to transmit a CTS-to-self frame to the second STA, so that a new STA sets the duration of the communications of the Green Phase if the second STA opens the Green Phase, or performs no treatment after the second STA opens the Green Phase and sets the duration of the communications of the Green Phase.

Alternatively, the second transmitting unit 1203 is also configured to perform operations of:

transmitting the Green-Phase-Setup frame to the second STA, so that the second STA opens the Green Phase, or opens the Green Phase and sets duration of communications of the Green Phase; and transmitting the Green-Phase-Setup frame to the third STA.

In further, the first Clear To Send frame is a CTS-to-self frame, the second transmitting subunit 12012 is further configured to transmit the CTS-to-self frame to the second STA, so that the second STA sets the duration of the communications of the Green Phase if the second STA opens the Green Phase, or performs no treatment after the second STA opens the Green Phase and sets the duration of the communications of the Green Phase.

Alternatively, the first Clear To Send frame is a CTS-to-self frame, reference may be made to FIG. 13, the first transmitting unit also includes: a third transmitting subunit 12013.

The third transmitting subunit 12013 is configured to transmit the CTS-to-self frame to the second STA, so that the second STA sets duration of an NAV of the second STA.

In further, the second transmitting unit 1203 is further configured to transmit a Green-Phase-Setup frame to the second STA, so that the second STA cancels the duration of the NAV of the second STA, opens the Green Phase and sets duration of communications of the Green Phase.

Alternatively, the first Clear To Send frame is a CTS-to-self frame, the third transmitting subunit 12013 is further configured to transmit the CTS-to-self frame to the second STA, so that the second STA sets duration of an NAV of the second STA.

In further, the second transmitting unit 1203 is also configured to perform operations of:

transmitting a Green-Phase-Setup frame to the second STA, so that the second STA cancels the duration of the NAV of the second STA, opens the Green Phase and sets duration of communications of the Green Phase; and transmitting the Green-Phase-Setup frame to the third STA.

According to an access point AP provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 15:
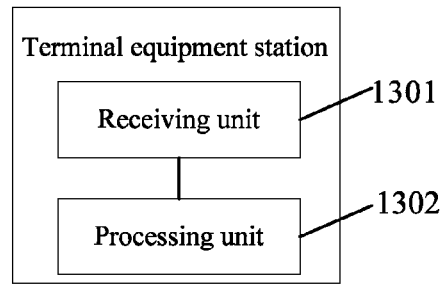
FIG. 15 is a schematic structural diagram of a terminal equipment STA according to an embodiment of the present invention.

An embodiment of the present invention provides a terminal equipment STA, reference may be made to FIG. 15, including: a receiving unit 1301 and a processing unit 1302.

The receiving unit 1301 is configured to receive a first Clear To Send frame transmitted by an access point AP.

The processing unit 1302 is configured to set duration of a network allocation vector NAV according to the first Clear To Send frame, and remain a silent state when the AP communicates with another STA.

The first Clear To Send frame is: a Clear To Send-to-self-advanced (CTS-to-self-advance) frame or a Clear To Send-to-self (CTS-to-self) frame.

According to a terminal equipment STA provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 16:
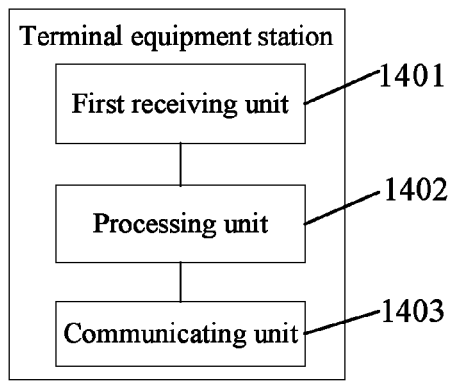
FIG. 16 is a schematic structural diagram of another terminal equipment STA according to an embodiment of the present invention.

An embodiment of the present invention provides a terminal equipment STA, reference may be made to FIG. 16, including: a first receiving unit 1401, a processing unit 1402 and a communicating unit 1403.

The first receiving unit 1401 is configured to receive a first Clear To Send frame transmitted by an access point AP.

The processing unit 1402 is configured to process a Green Phase operation according to the first Clear To Send frame.

The communicating unit 1403 is configured to communicate with the AP within a Green Phase period.

Figure 17:
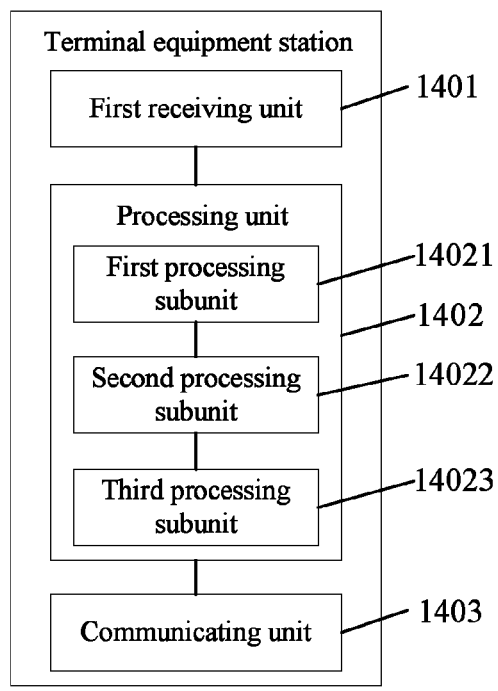
FIG. 17 is a schematic structural diagram of still another terminal equipment STA according to an embodiment of the present invention.

In further, the first Clear To Send frame is a Clear To Send-to-self-advanced (CTS-to-self-advanced) frame, reference may be made to FIG. 17, the processing unit 1402 includes: a first processing subunit 14021.

The first processing subunit 14021 is configured to open the Green Phase according to the CTS-to-self-advanced frame and set duration of communications of the Green Phase.

Figure 18:
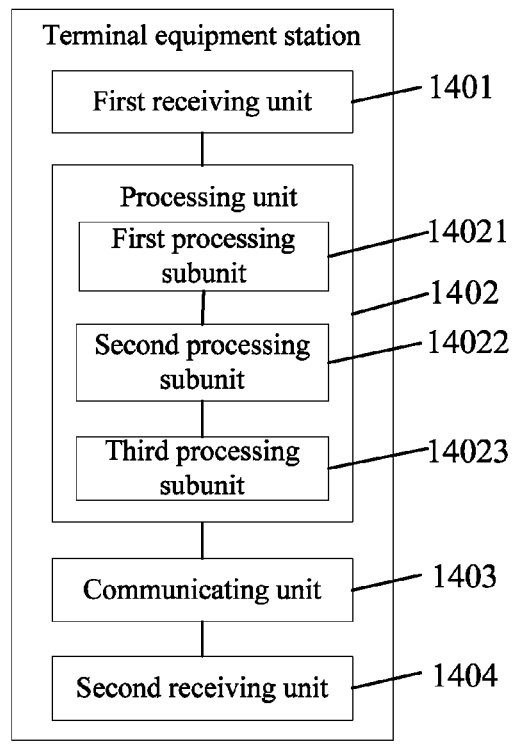
FIG. 18 is a schematic structural diagram of still another terminal equipment STA according to an embodiment of the present invention.

In further, reference may be made to FIG. 18, the STA also includes: a second receiving unit 1404.

The second receiving unit 1404 is configured to receive a Green-Phase-Setup frame transmitted by the AP.

The processing unit 1402 is further configured to open the Green Phase according to the Green-Phase-Setup frame, or open the Green Phase and set duration of communications of the Green Phase.

In further, the first Clear To Send frame is a Clear To Send-to-self (CTS-to-self) frame, reference may be made to FIG. 17, the processing unit 1402 also includes: a second processing subunit 14022.

The second processing subunit 14022 is configured to, set the duration of the communications of the Green Phase by a new STA if the Green Phase is opened.

Or, the second processing subunit 14022 is further configured to perform no treatment after the Green Phase is opened and the duration of the communications of the Green Phase is set.

Alternatively, the first Clear To Send frame is a CTS-to-self frame, reference may be made to FIG. 17, the processing unit 1402 also includes: a third processing subunit 14023.

The third processing subunit 14023 is configured to set duration of an NAV according to the CTS-to-self frame.

In further, the second receiving unit 1404 is further configured to receive a Green-Phase-Setup frame transmitted by the AP.

The processing unit 1402 is further configured to cancel the duration of the NAV according to the Green-Phase-Setup frame, open the Green Phase and set duration of communications of the Green Phase. The NAV herein is the NAV of the STA itself.

According to a terminal equipment STA provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 19:
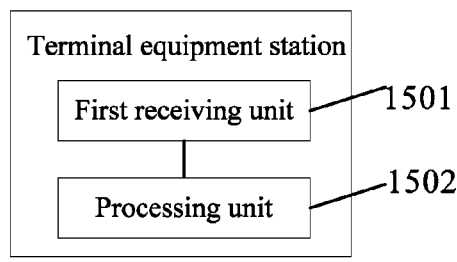
FIG. 19 is a schematic structural diagram of a terminal equipment STA according to another embodiment of the present invention.

An embodiment of the present invention provides a terminal equipment STA, reference may be made to FIG. 19, including: a first receiving unit 1501 and a processing unit 1502.

The first receiving unit 1501 is configured to receive a Clear To Send-to-self (CTS-to-self) frame transmitted by an access point AP.

The processing unit 1502 is configured to set duration of an NAV of the STA itself according to the CTS-to-self frame, and remain a silent state when the AP communicates with the second STA.

Figure 20:
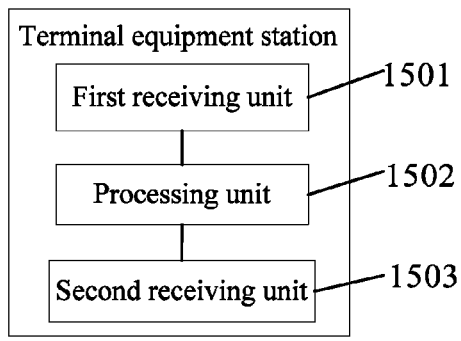
FIG. 20 is a schematic structural diagram of another terminal equipment STA according to another embodiment of the present invention.

In further, reference may be made to FIG. 20, the STA also includes: a second receiving unit 1503.

The second receiving unit 1503 is configured to receive a Green-Phase-Setup frame transmitted by the AP.

Alternatively, the second receiving unit 1503 is further configured to receive a Green-Phase-Setup frame transmitted by the AP.

According to a terminal equipment STA provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 21:
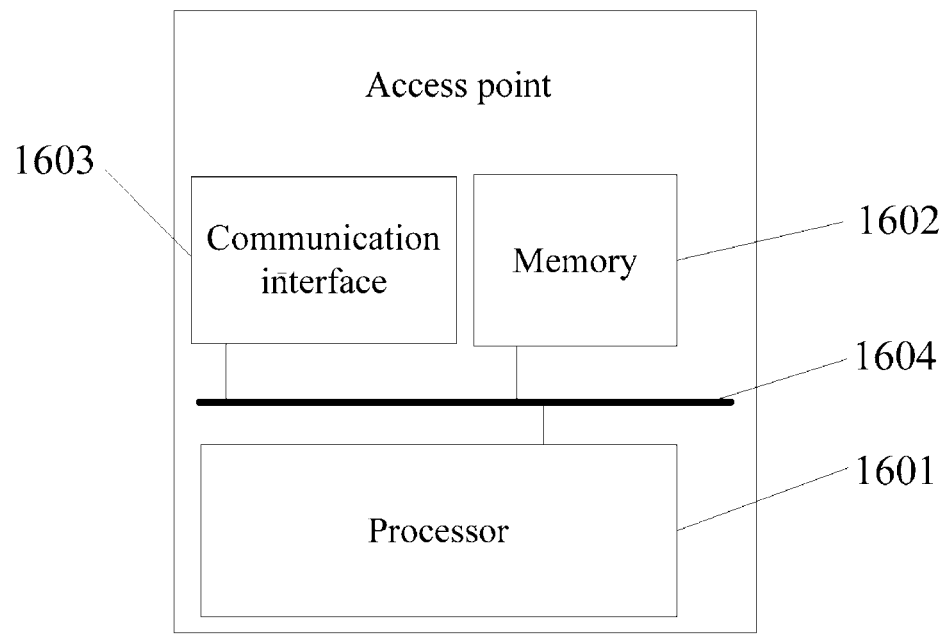
FIG. 21 is a schematic structural diagram of an access point according to another embodiment of the present invention.

An embodiment of the present invention provides an AP, reference may be made to FIG. 21, including: at least one processor 1601, a memory 1602, a communication interface 1603 and a bus 1604, where the at least one processor 1601, the memory 1602 and the communication interface 1603 are connected via the bus 1604, and communications thereamong are completed via the bus 1604.

The bus 1604 may be an industry standard architecture (ISA) bus, a peripheral component interconnect (PCI) bus or an extended industry standard architecture (EISA) bus, etc. The bus 1604 may be divided into an address bus, a data bus, a control bus, etc. For ease of representation, only a thick line is used in FIG. 21 for illustrations, but this does not mean that there is only one bus or one type of bus.

The memory 1602 is configured to store an executable program code, and the program code includes a computer operating instruction. The memory 1602 may include a high-speed RAM memory, and may also include a non-volatile memory, such as at least one disk memory.

The processor 1601 may be a central processing unit (CPU), or an application specific integrated circuit (ASIC), or is configured as one or more integrated circuits in embodiments of the present invention.

The communication interface 1603 is mainly used to implement communications among an AP, a first STA, a second STA and a third STA in this embodiment.

The processor 1601 is further configured to call a program code in the memory 1602, to perform operations of:

transmitting a first Clear To Send frame to a first station STA, so that the first STA sets duration of a network allocation vector NAV of the first STA and remains a silent state when the AP communicates with a second STA;

transmitting the first Clear To Send frame to the second STA, so that the second STA processes a Green Phase operation; and communicating with the second STA within a Green Phase period.

The processor 1601 is further configured to transmit the first Clear To Send frame to a third STA, so that the third STA sets duration of an NAV of the third STA and remains a silent state when the AP communicates with the second STA.

In further, the first Clear To Send frame is a Clear To Send-to-self-advanced (CTS-to-self-advanced) frame.

The processor 1601 is further configured to transmit the CTS-to-self-advanced frame to the second STA, so that the second STA opens the Green Phase and sets duration of communications of the Green Phase.

Alternatively, the processor 1601 is further configured to transmit a Green-Phase-Setup frame to the second STA, so that the second STA opens the Green Phase, or opens the Green Phase and sets duration of communications of the Green Phase.

In further, the first Clear To Send frame is a Clear To Send-to-self (CTS-to-self) frame The processor 1601 is further configured to transmit the CTS-to-self frame to the second STA, so that a new STA sets the duration of the communications of the Green Phase if the second STA opens the Green Phase, or performs no treatment after the second STA opens the Green Phase and sets the duration of the communications of the Green Phase.

Alternatively, the processor 1601 is further configured to perform operations of:

transmitting the Green-Phase-Setup frame to the second STA, so that the second STA opens the Green Phase, or opens the Green Phase and sets duration of communications of the Green Phase; and transmitting the Green-Phase-Setup frame to the third STA.

In further, the first Clear To Send frame is a CTS-to-self frame.

The processor 1601 is further configured to transmit the CTS-to-self frame to the second STA, so that the second STA sets the duration of the communications of the Green Phase if the second STA opens the Green Phase, or performs no treatment after the second STA opens the Green Phase and sets the duration of the communications of the Green Phase.

Alternatively, the first Clear To Send frame is a CTS-to-self frame.

The processor 1601 is further configured to transmit the CTS-to-self frame to the second STA, so that the second STA sets duration of an NAV of the second STA.

In further, the processor 1601 is further configured to transmit a Green-Phase-Setup frame to the second STA, so that the second STA cancels the duration of the NAV of the second STA, opens the Green Phase and sets duration of communications of the Green Phase.

Alternatively, the first Clear To Send frame is a CTS-to-self frame.

The processor 1601 is further configured to transmit the CTS-to-self frame to the second STA, so that the second STA sets duration of an NAV of the second STA.

In further, the processor 1601 is further configured to perform operations of:

transmitting a Green-Phase-Setup frame to the second STA, so that the second STA cancels the duration of the NAV of the second STA, opens the Green Phase and sets duration of communications of the Green Phase; and transmitting the Green-Phase-Setup frame to the third STA.

According to an AP provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 22:
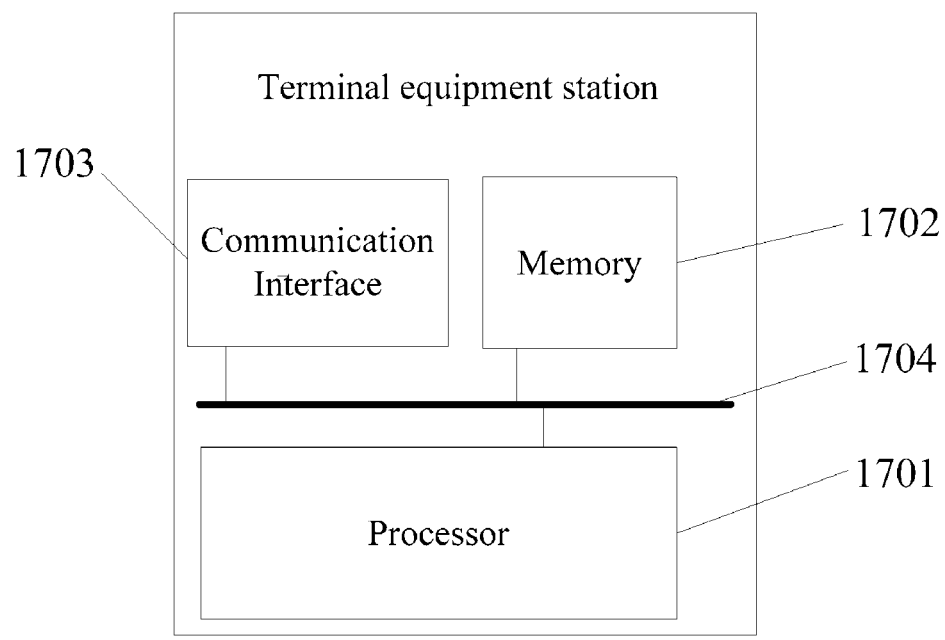
FIG. 22 is a schematic structural diagram of still another terminal equipment STA according to another embodiment of the present invention.

An embodiment of the present invention provides a terminal equipment STA, reference may be made to FIG. 22, including: at least one processor 1701, a memory 1702, a communication interface 1703 and a bus 1704, where the at least one processor 1701, the memory 1702 and the communication interface 1703 are connected via the bus 1704, and communications thereamong are completed via the bus 1704.

The bus 1704 may be an industry standard architecture (ISA) bus, a peripheral component interconnect (PCI) bus or an extended industry standard architecture (EISA) bus, etc. The bus 1704 may be divided into an address bus, a data bus, a control bus, etc. For ease of representation, only a thick line is used in FIG. 22 for illustrations, but this does not mean that there is only one bus or one type of bus.

The memory 1702 is configured to store an executable program code, and the program code includes a computer operating instruction. The memory 1702 may include a high-speed RAM memory, and may also include a non-volatile memory, such as at least one disk memory.

The processor 1701 may be a central processing unit (CPU), or an application specific integrated circuit (ASIC), or is configured as one or more integrated circuits in embodiments of the present invention.

The communication interface 1703 is mainly used to implement communications among an AP, a first STA, a second STA and a third STA in this embodiment.

The processor 1701 is further configured to call a program code in the memory 1702, to perform operations of:

receiving a first Clear To Send frame transmitted by an access point AP; and setting duration of a network allocation vector NAV of the first STA according to the first Clear To Send frame, and remaining a silent state when the AP communicates with another STA.

The first Clear To Send frame is: a Clear To Send-to-self-advanced (CTS-to-self-advance) frame or a Clear To Send-to-self (CTS-to-self) frame.

According to a terminal equipment STA provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 23:
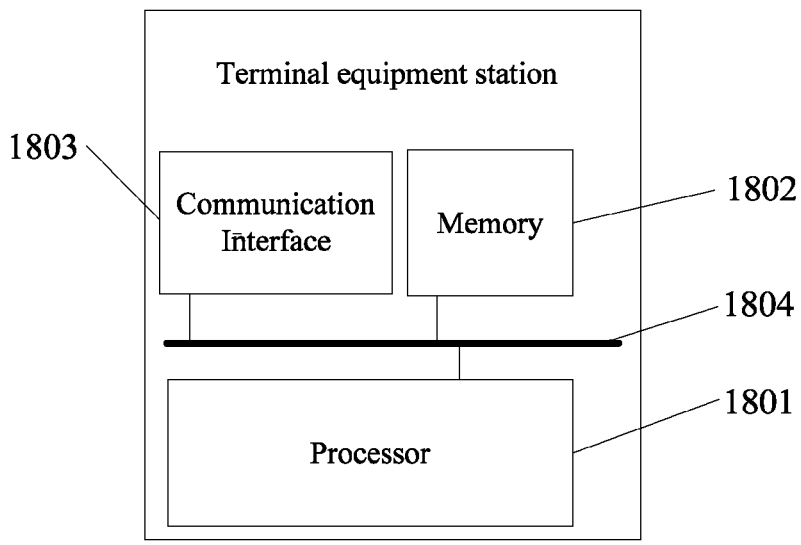
FIG. 23 is a schematic structural diagram of still another terminal equipment STA according to another embodiment of the present invention.

An embodiment of the present invention provides a terminal equipment STA, reference may be made to FIG. 23, including: at least one processor 1801, a memory 1802, a communication interface 1803 and a bus 1804, where the at least one processor 1801, the memory 1802 and the communication interface 1803 are connected via the bus 1804, and communications thereamong are completed via the bus 1804.

The bus 1804 may be an industry standard architecture (ISA) bus, a peripheral component interconnect (PCI) bus or an extended industry standard architecture (EISA) bus, etc. The bus 1804 may be divided into an address bus, a data bus, a control bus, etc. For ease of representation, only a thick line is used in FIG. 23 for illustrations, but this does not mean that there is only one bus or one type of bus.

The memory 1802 is configured to store an executable program code, and the program code includes a computer operating instruction. The memory 1802 may include a high-speed RAM memory, and may also include a non-volatile memory, such as at least one disk memory.

The processor 1801 may be a central processing unit (CPU), or an application specific integrated circuit (ASIC), or is configured as one or more integrated circuits in embodiments of the present invention.

The communication interface 1803 is mainly used to implement communications among an AP, a first STA, a second STA and a third STA in this embodiment.

The processor 1801 is further configured to call a program code in the memory 1802, to perform operations of:

receiving a first Clear To Send frame transmitted by an access point AP;

processing a Green Phase operation according to the first Clear To Send frame; and communicating with the AP within a Green Phase period.

In further, the first Clear To Send frame is a Clear To Send-to-self-advanced (CTS-to-self-advanced) frame.

The processor 1801 is further configured to open the Green Phase according to the CTS-to-self-advanced frame and set duration of communications of the Green Phase.

The processor 1801 is further configured to receive a Green-Phase-Setup frame transmitted by the AP.

The processor 1801 is further configured to open the Green Phase according to the Green-Phase-Setup frame, or open the Green Phase and set duration of communications of the Green Phase.

In further, the first Clear To Send frame is a Clear To Send-to-self (CTS-to-self) frame, the processor 1801 is further configured to perform operations of:

if the Green Phase is opened, then setting the duration of the communications of the Green Phase by a new STA;

or, after the Green Phase is opened and the duration of the communications of the Green Phase is set, performing no treatment.

Alternatively, the first Clear To Send frame is a CTS-to-self frame.

The processor 1801 is further configured to set duration of an NAV of the second STA according to the CTS-to-self frame.

The processor 1801 is further configured to cancel the duration of the NAV according to the Green-Phase-Setup frame, open the Green Phase and set duration of communications of the Green Phase.

According to a terminal equipment STA provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 24:
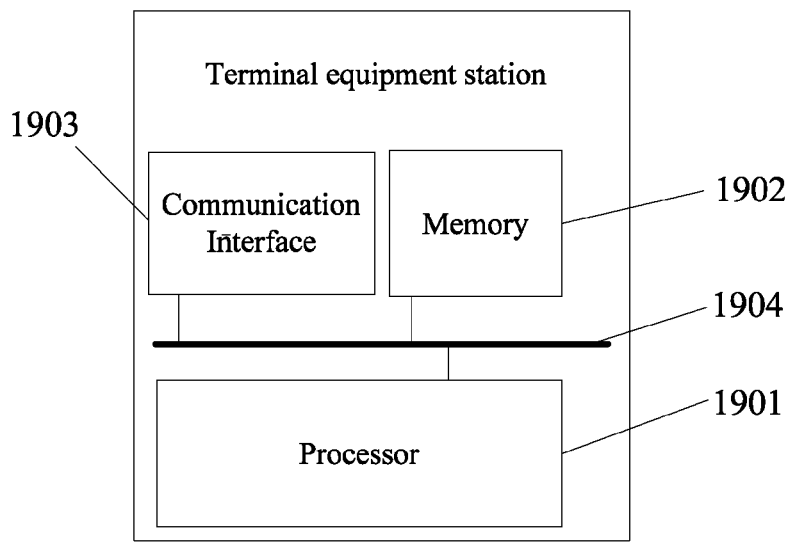
FIG. 24 is a schematic structural diagram of a terminal equipment STA according to still another embodiment of the present invention.

An embodiment of the present invention provides a terminal equipment STA, reference may be made to FIG. 24, including: at least one processor 1901, a memory 1902, a communication interface 1903 and a bus 1904, where the at least one processor 1901, the memory 1902 and the communication interface 1903 are connected via the bus 1904, and communications thereamong are completed via the bus 1904.

The bus 1904 may be an industry standard architecture (ISA) bus, a peripheral component interconnect (PCI) bus or an extended industry standard architecture (EISA) bus, etc. The bus 1904 may be divided into an address bus, a data bus, a control bus, etc. For ease of representation, only a thick line is used in FIG. 24 for illustrations, but this does not mean that there is only one bus or one type of bus.

The memory 1902 is configured to store an executable program code, and the program code includes a computer operating instruction. The memory 1902 may include a high-speed RAM memory, and may also include a non-volatile memory, such as at least one disk memory.

The processor 1901 may be a central processing unit (CPU), or an application specific integrated circuit (ASIC), or is configured as one or more integrated circuits in embodiments of the present invention.

The communication interface 1903 is mainly used to implement communications between an AP and a terminal equipment STA in this embodiment.

The processor 1901 is further configured to call a program code in the memory 1902, to perform operations of:

receiving a Clear To Send-to-self (CTS-to-self) frame transmitted by an access point AP; and setting duration of an NAV according to the CTS-to-self frame, and remaining a silent state when the AP communicates with another STA.

The processor 1901 is further configured to receive a Green-Phase-Setup frame transmitted by the AP.

Alternatively, the processor 1901 is further configured to receive a Green-Phase-Setup frame transmitted by the AP.

According to a terminal equipment STA provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Figure 25:
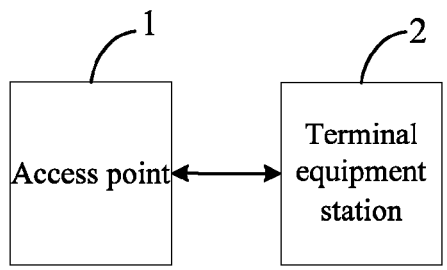
FIG. 25 is a schematic structural diagram of a system for establishing a transmission mode according to an embodiment of the present invention.

An embodiment of the present invention provides a system for establishing a transmission mode, reference may be made to FIG. 25, including: an access point AP1 and a terminal equipment STA2.

The AP1 is any one of APs in the embodiments corresponding to FIG. 12~14; and the STA2 is any one of STAs in the embodiments corresponding to FIG. 15~20.

Or, the AP1 is an AP in the embodiment corresponding to FIG. 21; and the terminal equipment STA2 is any one of STAs in the embodiments corresponding to FIG. 22~24.

According to a system for establishing a transmission mode provided in an embodiment of the present invention, by means of using a green phase protocol for communications during data transmission, backward compatibilities of an existing WLAN system and a next generation WLAN system are ensured, introduction of a new technology in the next generation WLAN protocol is realized during data transmission, performance advantages of the new technology in the next generation WLAN protocol are exploited, and meanwhile network performance is improved.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as an ROM, an RAM, a magnetic disk, or an optical disc.

The above descriptions are merely specific embodiments of the present invention; however, the protection scope of the present invention is not limited thereto. Any modification or replacement that may be readily envisaged of by persons skilled in the art within the technical scope disclosed in the present invention should fall into the protection scope of the present invention. Thus, the protection scope of the present invention shall be subject to the claims.

What is claimed is:

1. A method for establishing a transmission mode, comprising:

transmitting, by an access point (AP), a first Clear To Send frame to a first station (STA), to enable the first STA to set a duration of a network allocation vector (NAV) of the first STA and remain in a silent state when the AP communicates with a second STA;

transmitting, by the AP, the first Clear To Send frame to the second STA so that the second STA processes a Green Phase operation of a Green Phase; and communicating, by the AP, with the second STA within a Green Phase period, wherein before the transmitting, by the AP, the first Clear To Send frame to the first STA, to enable the first STA to set the duration of the NAV of the first STA and remain in the silent state when the AP communicates with the second STA, the method further comprises:

transmitting a Green-Phase-Setup frame to the second STA, to enable the second STA to open the Green Phase, or open the Green Phase and set a duration of communications of the Green Phase.

2. The method according to claim 1, further comprising, after the transmitting the first Clear To Send frame to the second STA:

transmitting the first Clear To Send frame to a third STA, to enable the third STA to set duration of a NAV of the third STA and remain in a silent state when the AP communicates with the second STA.

3. The method according to claim 2, further comprising, before the transmitting, by the AP, the first Clear To Send frame to the first STA, to enable the first STA to set the duration of the network allocation vector NAV of the first STA and remain in the silent state when the AP communicates with the second STA:
transmitting a Green-Phase-Setup frame to the second STA, to enable the second STA to open the Green Phase, or open the Green Phase and set a duration of communications of the Green Phase; and
transmitting the Green-Phase-Setup frame to the third STA.

4. The method according to claim 3, wherein, the first Clear To Send frame is a CTS-to-self frame, the transmitting the first Clear To Send frame to the second STA, to enable the second STA to process the Green Phase operation, comprises:
transmitting the CTS-to-self frame to the second STA, to enable the second STA to set the duration of the communications of the Green Phase if the second STA opens the Green Phase, or perform no treatment after the second STA opens the Green Phase and sets the duration of the communications of the Green Phase.

5. The method according to claim 2, wherein, the first Clear To Send frame is a CTS-to-self frame, and the transmitting the first Clear To Send frame to the second STA, to enable the second STA to process the Green Phase operation, comprises:
transmitting the CTS-to-self frame to the second STA, to enable the second STA to set a duration of a NAV of the second STA.

6. The method according to claim 1, wherein, the first Clear To Send frame is a Clear To Send-to-self-advanced (CTS-to-self-advanced) frame, and the transmitting the first Clear To Send frame to the second STA, to enable the second STA to process the Green Phase operation, comprises:
transmitting the CTS-to-self-advanced frame to the second STA, to enable the second STA to open the Green Phase and set a duration of communications of the Green Phase.

7. The method according to claim 1, wherein, the first Clear To Send frame is a Clear To Send-to-self (CTS-to-self) frame, the transmitting the first Clear To Send frame to the second STA, to enable the second STA to process the Green Phase operation, comprises:
transmitting the CTS-to-self frame to the second STA, to enable the second STA to set the duration of the communications of the Green Phase if the second STA opens the Green Phase, or perform no treatment after the second STA opens the Green Phase and sets the duration of the communications of the Green Phase.

8. The method according to claim 1, wherein, the first Clear To Send frame is a CTS-to-self frame, and the transmitting the first Clear To Send frame to the second STA, to enable the second STA to process the Green Phase operation, comprises:
transmitting the CTS-to-self frame to the second STA, to enable the second STA to set a duration of a NAV of the second STA.

9. The method according to claim 8, wherein, after the transmitting the CTS-to-self frame to the second STA, to enable the second STA to set the duration of the NAV of the second STA, further comprising:
transmitting a Green-Phase-Setup frame to the second STA, to enable the second STA to cancel the duration of the NAV of the second STA, open the Green Phase and set a duration of communications of the Green Phase.

10. A method for establishing a transmission mode, comprising:
receiving, by a first station (STA), a first Clear To Send frame transmitted by an access point (AP); and
setting a duration of a network allocation vector (NAV) of the first STA according to the first Clear To Send frame, and remaining in a silent state when the AP communicates with a second STA,
receiving, by the second STA, the first Clear To Send frame transmitted by the AP so the second STA processes a Green Phase operation of a Green Phase;
communicating, by the second STA, with the AP within a Green Phase period,
wherein before the receiving, by the first STA, the first Clear To Send frame transmitted by the AP, the second STA receives a Green-Phase-Setup frame, to enable the second STA to open the Green Phase, or open the Green Phase and set a duration of communications of the Green Phase.

11. The method according to claim 10, wherein,
the first Clear To Send frame is a Clear To Send-to-self-advanced (CTS-to-self-advance) frame or a Clear To Send-to-self (CTS-to-self) frame.

12. A method for establishing a transmission mode, comprising:
receiving, by a first station (STA), a first Clear To Send frame transmitted by an Access Point (AP) to enable the first STA to set a duration of a network allocation vector (NAV) of the first STA and remain in a silent state when the AP communicates with a second station;
receiving, by a second station (STA), the first Clear To Send frame transmitted by the AP;
processing, by the second STA, a Green Phase operation of a Green Phase according to the first Clear To Send frame; and
communicating with the AP within a Green Phase period,
wherein before the receiving, by the second STA, the first Clear To Send frame transmitted by the AP, the method further comprises:
receiving, by the second STA, a Green-Phase-Setup frame transmitted by the AP; and
opening, by the second STA, the Green Phase, or opening the Green Phase and setting a duration of communications of the Green Phase according to the Green-Phase-Setup frame.

13. The method according to claim 12, wherein, the first Clear To Send frame is a Clear To Send-to-self-advanced (CTS-to-self-advanced) frame, and the processing the Green Phase operation according to the first Clear To Send frame comprises:
opening the Green Phase according to the CTS-to-self-advanced frame and setting a duration of communications of the Green Phase.

14. The method according to claim 12, wherein, the first Clear To Send frame is a Clear To Send-to-self (CTS-to-self) frame, the processing the Green Phase operation according to the first Clear To Send frame comprises:
if the second STA opens the Green Phase, then setting, by a new STA, the duration of the communications of the Green Phase.

15. The method according to claim 12, wherein, the first Clear To Send frame is a Clear To Send-to-self (CTS-to-self) frame, the processing the Green Phase operation according to the first Clear To Send frame comprises:

after the second STA opens the Green Phase and sets the duration of the communications of the Green Phase, performing no treatment.

16. The method according to claim 12, wherein, the first Clear To Send frame is a CTS-to-self frame, the processing the Green Phase operation according to the first Clear To Send frame comprises:
setting a duration of a network allocation vector (NAV) of the second STA according to the CTS-to-self frame.

17. A method for establishing a transmission mode, comprising:
receiving, by a third station (STA), a first Clear To Send frame transmitted by an access point (AP); and
setting duration of a network allocation vector (NAV) of the third STA according to the first Clear To Send frame, and remaining in a silent state when the AP communicates with a second STA,
receiving, by the second STA, the first Clear To Send frame transmitted by the AP so the second STA processes a Green Phase operation of a Green Phase;
communicating, by the second STA, with the AP within the Green Phase period;
wherein, the first Clear To Send frame is a Clear To Send-to-self (CTS-to-self) frame, and either before or after the receiving, by the third STA, the first Clear To Send frame transmitted by the AP, the method further comprises:
receiving, by the second STA, a Green-Phase-Setup frame transmitted by the AP, to enable the second STA to open the Green Phase, or open the Green Phase and set a duration of the communications of the Green Phase.

* * * * *